US 12,141,520 B2

(12) United States Patent
McVeigh et al.

(10) Patent No.: US 12,141,520 B2
(45) Date of Patent: Nov. 12, 2024

(54) SYSTEMS, DEVICES, AND METHODS FOR COMPOSITION AND PRESENTATION OF AN INTERACTIVE ELECTRONIC DOCUMENT

(71) Applicant: Suvoda LLC, Conshohocken, PA (US)

(72) Inventors: Andrew James Lawson McVeigh, Malibu, CA (US); Mihai Pintilie, Iasi (RO); Jagath Chandima Wanninayake, Conshohocken, PA (US); Parth Pradipkumar Chopra, Middletown, DE (US)

(73) Assignee: Suvoda LLC, Conshohocken, PA (US)

( * ) Notice: Subject to any disclaimer, the term of this patent is extended or adjusted under 35 U.S.C. 154(b) by 0 days.

(21) Appl. No.: 18/066,424

(22) Filed: Dec. 15, 2022

(65) Prior Publication Data

US 2023/0385530 A1 Nov. 30, 2023

Related U.S. Application Data

(63) Continuation of application No. 17/968,680, filed on Oct. 18, 2022.

(60) Provisional application No. 63/412,838, filed on Oct. 3, 2022, provisional application No. 63/347,442, filed on May 31, 2022.

(51) Int. Cl.
*G06F 40/166* (2020.01)
(52) U.S. Cl.
CPC .................. *G06F 40/166* (2020.01)
(58) Field of Classification Search
CPC .... G06F 40/166; G06F 40/186; G06F 40/197; G06F 40/106; G06F 40/58
See application file for complete search history.

(56) References Cited

U.S. PATENT DOCUMENTS

| | | | |
|---|---|---|---|
| 9,449,126 B1 * | 9/2016 | Genoni | G06F 40/106 |
| 9,928,230 B1 | 3/2018 | Jain et al. | |
| 10,248,396 B1 * | 4/2019 | Wiggins | G06F 8/71 |
| 10,503,497 B2 * | 12/2019 | Douglas | G06F 8/44 |

(Continued)

FOREIGN PATENT DOCUMENTS

WO WO-2012082005 A1 * 6/2012 .......... G06F 17/289

OTHER PUBLICATIONS

U.S. Appl. No. 17/968,680, filed Dec. 15, 2022, Andrew James Lawson McVeigh (Suvoda LLC).

(Continued)

*Primary Examiner* — Chau T Nguyen
(74) *Attorney, Agent, or Firm* — Ballard Spahr LLP

(57) ABSTRACT

Technologies are provided for composition and presentation of an interactive electronic document. Some embodiments include a computing device. The computing device includes at least one processor that executes computer-executable components stored in at least one memory device. The computer-executable components can include a runtime component configured to apply a navigation rule corresponding to a navigation mode for a series of views, where at least one view in the series of views can include a respective prompt. The compute-executable components also can include a coordination component configured to cause presentation of at least one view of the series of views in response to the runtime component applying the navigation rule.

25 Claims, 25 Drawing Sheets

(56) References Cited

U.S. PATENT DOCUMENTS

| | | |
|---|---|---|
| 11,275,754 B2 | 3/2022 | Wilson et al. |
| 2010/0281355 A1 | 11/2010 | White et al. |
| 2013/0139139 A1 | 5/2013 | Mallur et al. |
| 2015/0177964 A1 | 6/2015 | Spirer |
| 2015/0242579 A1 | 8/2015 | Walmer et al. |
| 2016/0267074 A1 | 9/2016 | Nozue |
| 2017/0068743 A1* | 3/2017 | Kumar .................. G06F 40/166 |
| 2018/0203578 A1* | 7/2018 | Murphy ................ G06F 3/0481 |
| 2018/0344215 A1 | 12/2018 | Ohnemus et al. |
| 2019/0179882 A1* | 6/2019 | Weiss .................... G06F 40/166 |
| 2019/0222619 A1 | 7/2019 | Shribman et al. |
| 2019/0235862 A1* | 8/2019 | Douglas .................. G06F 8/44 |
| 2020/0174630 A1 | 6/2020 | Rosenberg |
| 2022/0035988 A1* | 2/2022 | Mason .................. G06F 40/166 |
| 2022/0093220 A1 | 3/2022 | Feuerstein |
| 2022/0284993 A1 | 9/2022 | Ellis et al. |
| 2023/0036983 A1* | 2/2023 | Akkad .................. G06F 40/226 |
| 2023/0121261 A1 | 4/2023 | Child et al. |
| 2023/0267285 A1 | 8/2023 | Wu et al. |

OTHER PUBLICATIONS

U.S. Appl. No. 18/066,462, filed Dec. 15, 2022, Andrew James Lawson McVeigh (Suvoda LLC).

U.S. Appl. No. 18/066,459, filed Dec. 15, 2022, Andrew James Lawson McVeigh (Suvoda LLC).

\* cited by examiner

FIG. 10A

```
            "elements": [
              {
                "code": "ease_of_use_p2_prompt",
                "promptShortName": "ease_of_use_p2_prompt",
                "promptShortDescription": "ease_of_use_p2_prompt",
                "kind": "PROMPT",
                "subkind": "VRS",
                "promptDescription": {
                  "code": "ease_of_use_p2_prompt_description",
                  "text": "How difficult or easy was it to use the product",
                },
                "required": true,
                "properties": {
                  "choicesList": {
                    "code": "very_difficult-to-very_easy",
                    "choices": [
                      {
                        "code": "very_difficult",
                        "value": "1",
                        "choiceText": {
                          "code": "very_difficult_text",
                          "text": "Very difficult"
                        }
                      },
                      {
                        "code": "difficult",
                        "value": "2",
                        "choiceText": {
                          "code": "difficult",
                          "text": "Difficult"
                        }
                      },
                      {
                        "code": "somewhat_difficult",
                        "value": "3",
                        "choiceText": {
                          "code": "somewhat_difficult",
                          "text": "Somewhat difficult"
                        }
                      },
                      {
                        "code": "somewhat_easy",
                        "value": "4",
                        "choiceText": {
                          "code": "somewhat_easy",
                          "text": "Somewhat easy"
                        }
                      },
                      {
                        "code": "easy",
                        "value": "5",
                        "choiceText": {
```

```
1  {
2      "code": "TRN_HOME+L",
3      "document": {
4        "sections": [
5          {
6            "code": "MainSection",
7            "pages": [
8              {
9                "code": "P1",
10               "description": {
11                 "alignment": "CENTER",
12                 "fontSize": "25px",
13                 "indent": {
14                   "top": 12
15                 }
16               },
17               "footer": {
18                 "fontSize": "16px"
19               }
20             },
21             {
22               "code": "P2",
23               "title": {
24                 "fontSize": "25px"
25               },
26               "description": {
27                 "fontSize": "20px",
28                 "indent": {
29                   "top": 3
30                 }
31               },
```

FIG. 10D

| ACTIVE | ARCHIVE | | | | |
|---|---|---|---|---|---|
| CLEAR FILTERS  X name | | | | | |
| Code | Name | Last Modified | Modified By | Version | Type | Description |
| TNR_HOME | ░░░░░░░░ | 2122-09-22 ░░:░░:░░ | user01 | 1.0.0 | ePRO | This training assessment is a general assessment program that will provide you with foundational knowledge about how to navigate the app computer and how to answer questions. |
| TrainingQuestionnaire | ░░░░░░░░ | 2122-08-10 ░░:░░:░░ | user17 | | | |
| AlinaTraining | ░░░░░░░░ | 2122-08-09 ░░:░░:░░ | user17 | | | |

Training [At-Home]

This Training Assessment is a general onboarding program that will provide you a its background knowledge about how to navigate the app navigation and how to answer questions.

Type        Date Created    Code          External Version
ePRO        Sep 22 2122     TRN_HOME      1.0.0

Interactive Document Files

⬇ EXPORT   ⊕ ADD NEW

| Name | Last Modified | Modified By | Type | Locale | Resolution | Orientation |
|---|---|---|---|---|---|---|
| Definition | 2122-09-22 00:24:38 | user01 | Definition | | | |
| Translation (en-US) | 2122-08-10 00:23:33 | user17 | Translation | en-US | | |
| Layout (default) | 2122-08-09 00:24:33 | user17 | Layout | | | |

1150

Home | Info | Editor | Preview

FIG. 11B

SYSTEMS, DEVICES, AND METHODS FOR COMPOSITION AND PRESENTATION OF AN INTERACTIVE ELECTRONIC DOCUMENT

CROSS-REFERENCE TO RELATED APPLICATIONS

This application is a continuation of U.S. patent application Ser. No. 17/968,680, filed Oct. 18, 2022, which claims the benefit of and priority to U.S. Provisional Patent Application No. 63/347,442, filed May 31, 2022, and U.S. Provisional Patent Application No. 63/412,838, filed Oct. 3, 2022, the contents of which applications are hereby incorporated by reference herein in their entireties.

BACKGROUND

Commonplace approaches to generating an interactive electronic document typically include using a declarative description of the structure of the interactive electronic document and branching logic associated with the interactive electronic document. Although declarative descriptions can be well suited for straightforward interactive electronic documents, the suitability of declarative descriptions may become inadequate for more sophisticated interactive electronic documents having rich interactivity requirements, deep logic, and/or complex validation constraints. Examples of such more sophisticated interactive electronic documents include clinical questionnaires, detailed consent documents, guides for independent tasks, and similar documents.

Other existing approaches to generating an interactive electronic document can rely on a large amount of program code that configures the interactive electronic document. Such approaches can be referred to as high-code approaches and provide a wide range of flexibility by construction. That is, most any adjustment to the interactive electronic document can be implemented by adjusting the codebase that forms that document. High-code approaches, however, are time consuming and rather fragile. Indeed, changes to a portion of an interactive electronic document configured using a high-code approach may require revalidation of the entire workflow underpinning the interactive electronic document irrespective of the scope of the changes.

Therefore, much remains to be improved in technologies for composition and presentation of electronic questionnaires and, more generally, interactive electronic documents.

SUMMARY

It is to be understood that both the following general description and the following detailed description are illustrative and explanatory only and are not restrictive.

In one embodiment, the disclosure provides a computing system. The computing system includes a computing device. The computing device includes at least one processor that executes computer-executable components stored in at least one memory device. The computer-executable components can include a runtime component configured to apply navigation rules corresponding to a navigation mode for a series of views, where at least one view in the series of views can include a respective prompt. The series of views, and logic that may be associated therewith, can be configured in terms of human-readable content formatted as NO-CODE statements or LOW-CODE statements, or a combination thereof. The computer-executable components also can include a coordination component configured to cause presentation of at least one view of the series of views in response to the runtime component applying the navigation rule. The computer-executable components also include a presentation component configured to draw respective user interfaces corresponding to the at least one view.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

FIG. 10A illustrates an example of a user interface in accordance with one or more embodiments of this disclosure.

FIG. 10B illustrates an example of human-readable text that defines, at least in part, the view shown in a section of FIG. 10A.

FIG. 10C illustrates another example of user interface in accordance with one or more embodiments of this disclosure.

FIG. 10D illustrates an example of human-readable text that defines, at least in part, the view shown in a section of FIG. 10C.

FIG. 11A illustrates yet another example of a user interface in accordance with one or more embodiments of this disclosure.

FIG. 11B illustrates still another example of a user interface in accordance with one or more embodiments of this disclosure.

DETAILED DESCRIPTION

The disclosure recognizes and addresses, among other technical challenges, the issues of composition and presentation of an interactive electronic document. An example of an interactive electronic document is an electronic clinical outcome assessment (eCOA). Another example of an interactive electronic document is an electronic consent document. As is described in greater detail below, embodiments of this disclosure permit composing and presenting an interactive electronic document by separating (i) definition aspects involved in the configuration of a series of views and various logic associated with the series of views, where such logic includes navigation logic, branching logic, and validation logic, for example; (ii) the configuration of translation aspects involved in the consumption of the series of views in a desired natural language; and (iii) layout aspects involved in the configuration of layouts of UI elements corresponding to each view of the series of views on a particular computing device that has a defined set of resolutions. By separating those aspects, embodiments of this disclosure provide greater flexibility and efficiency, relative to existing technologies, in the development and presentation of interactive electronic documents. More specifically, in contrast to existing technologies, by separating those aspects, embodiments of this disclosure permit scalable and efficient use of computing resources when configuring interactive electronic documents having a gamut of complexities ranging from simple to highly-complex documents. Additionally, by separating those aspects, embodiments of this disclosure also provide greater integrity with respect to validity of elements that constitute an interactive electronic document. Such flexibility can include the seamless implementation of an interactive electronic document for presentation in a computing device having a desired type of UI element library (native or custom) without changes to existing configuration of translation aspects and/or definition of views and associated logic. The computing device can be a personal computing device or an institutional computing device (such as a computing device provided by a hospital, a testing center, a public library, or similar).

Figure 1:
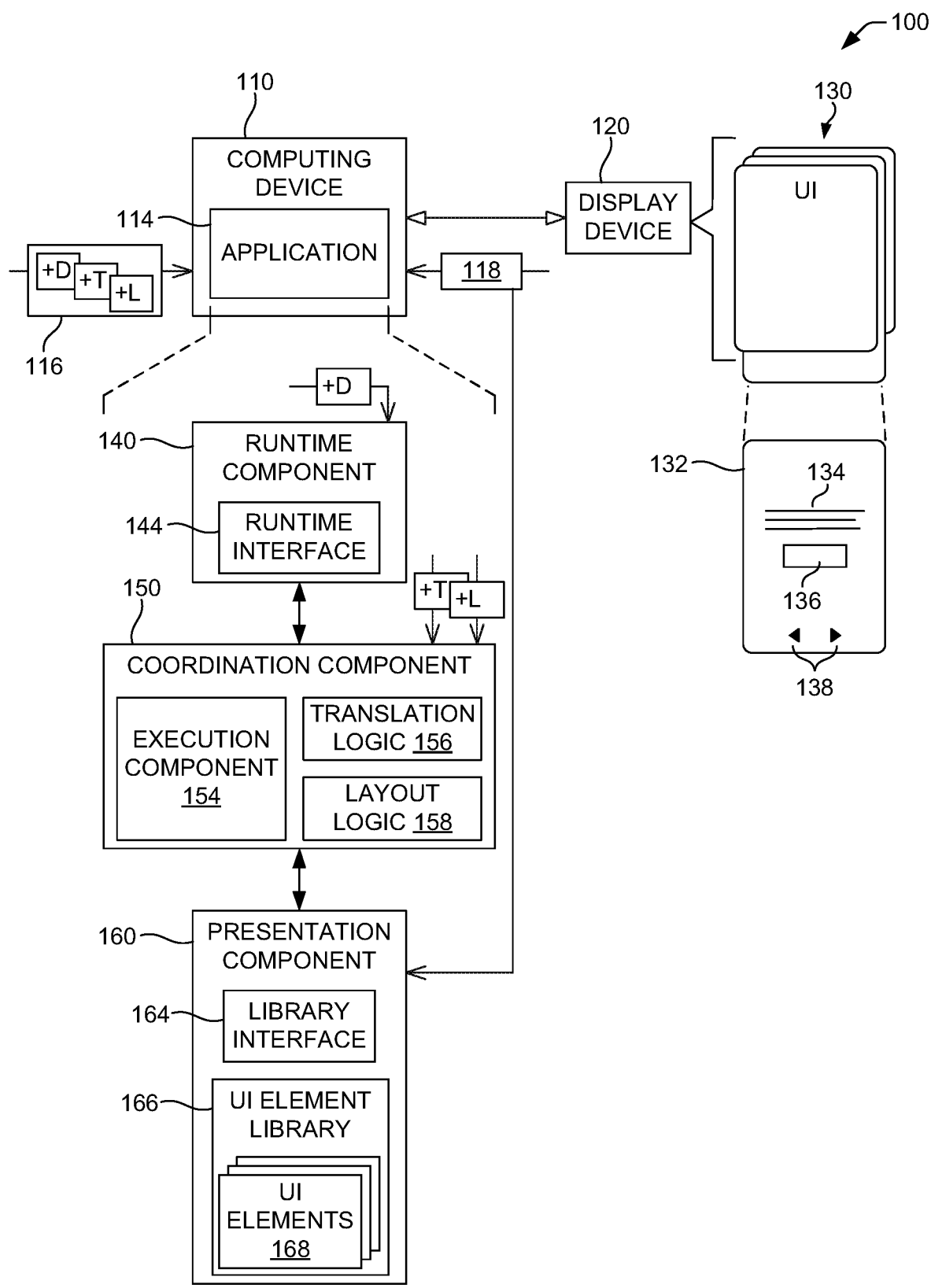
FIG. 1 illustrates an example of a computing system, in accordance with one or more embodiments of this disclosure.

With respect to the drawings, FIG. 1 illustrates an example of a computing system 100, in accordance with one or more embodiments of this disclosure. The exemplified computing system 100 includes a computing device 110 that can include a software application 114 (e.g., a mobile application, a web-application, a web browser, or another type of application). In response to being executed, the software application 114 can cause a display device 120 to present multiple user interfaces 130 (UIs 130) that can form part of a series of views. Each view of the series of views can include one or multiple prompts. A prompt can be a question or a call to action. The multiple user interfaces 130 can be presented in sequence—or as a sequence of views in the series of views—where each UI of the multiple UIs 130 embodies a view of the series of views. In some cases, the series of views forms or otherwise represents a questionnaire, and the sequence of multiple user interfaces 130 embodies a digital (or electronic) instance of the questionnaire. The questionnaire can correspond to a clinical outcome assessment (COA), a triage assessment, neuropsychological assessment, a scholastic aptitude assessment, a vocational assessment, a professional certification assessment, licensure assessment, or similar. A COA, and the corresponding eCOA instance implemented in accordance with this disclosure, can include patient reported outcome (PRO) where a patient can complete the COA; performance outcome (PerfO); clinician reported outcome (ClinRO); or observer reported outcome (ObsRO). The multiple UIs 130 can include, for example, a combination of a landing page (e.g., an index page or table of contents), a section of the questionnaire, a result(s) page, a result summary page, and similar pages. In other cases, the series of views forms or otherwise represents another type of document, and the sequence of multiple user interfaces 130 embodies a digital (or electronic) instance of the document. Simply as an illustration, in such other cases, the series of views can represent a consent document, a privacy practice document, a liability waiver document, an independent-task guide (e.g. an installation guide or a troubleshooting guide), or similar.

A navigation mode can dictate the manner of traversal of the series of views (e.g., a questionnaire, consent document, or similar). Accordingly, the particular views presented in the sequence of multiple UIs 130 can be dictated, at least partially, by the navigation mode. Execution of the software application 114 can cause the display device 120 to present the multiple UIs 130 in sequence (e.g., one UI after another UI) and according to one of several navigation modes. In other words, during execution of the software application 114, the series of views (e.g., a questionnaire or consent document) including the multiple UIs 130 can be traversed according to a particular navigation mode of the several navigation modes.

The several navigation modes can include, for example, a linear mode, a hub-and-spoke mode, and a computer-adaptive-test (CAT) mode, for example. For purposes of illustration, a linear mode causes traversal of the series of views in order, one view at a time, until all the views in the series have been traversed. Each view includes a control element (such as a "Next" button) that is selectable and, in response to being selected, advances the view to a next consecutive view. That is, each UI corresponding to a respective view includes the control element, and selection of the control element causes the display device 120 to transition from a current view to a next consecutive view. In an example scenario where the series of views is an eCOA, such a linear mode is the primary mode used for subject-recorded outcomes (also referred to as subject-reported outcomes).

As further illustration, a hub-and-spoke mode permits fast navigation to an appropriate section of the series of views. As part of navigation of the series of views in such a mode, a particular view corresponding to a table of contents (hub) can be shown at the display device 120 listing all sections within the series of views. Each section in the table of contents can be shown using a selectable UI element. That particular view also can include indicia indicating a proportion of sections that have been completed. An end-user can select (e.g., click or tap) a section, answer questions (spokes), and can then return to the table of contents. In an example scenario where the series of views is an eCOA, the hub-and-spoke mode is a relevant mode typically used for clinician-recorded outcomes. In such scenario, the hub-and-spoke mode is used to record responses from subject interviews, where a subject can answer different questions in different sections quickly as the subject describes their symptoms and outcomes. As such, a clinician needs to be able to navigate efficiently through different sections.

As still further illustration, CAT mode permits dynamically adjusting the navigation between views in a series of views as an end-user responds to prompts within the views. Transition from a first section in the series of views to a second section in the series of views can be based on the content of responses to prompt(s) in the first section. In one example, in cases where the series of view represents an eCOA, depending on answers to a first section assessing pain, the flow of the questionnaire can proceed to either a second section that probes how well a subject is feeling (in case of low pain, for example) or a third section that instead probes if the pain is manageable (in case of high pain, for example). In example scenarios where the series of view correspond to an electronic assessment (such as an eCOA, an electronic licensure assessment, etc.), the CAT mode can update a score while the electronic assessment is in progress (e.g., while the series of views are being traversed) and can use intermediate updates to the score to select further questions to be shown in order to get a more accurate result.

Figure 2:
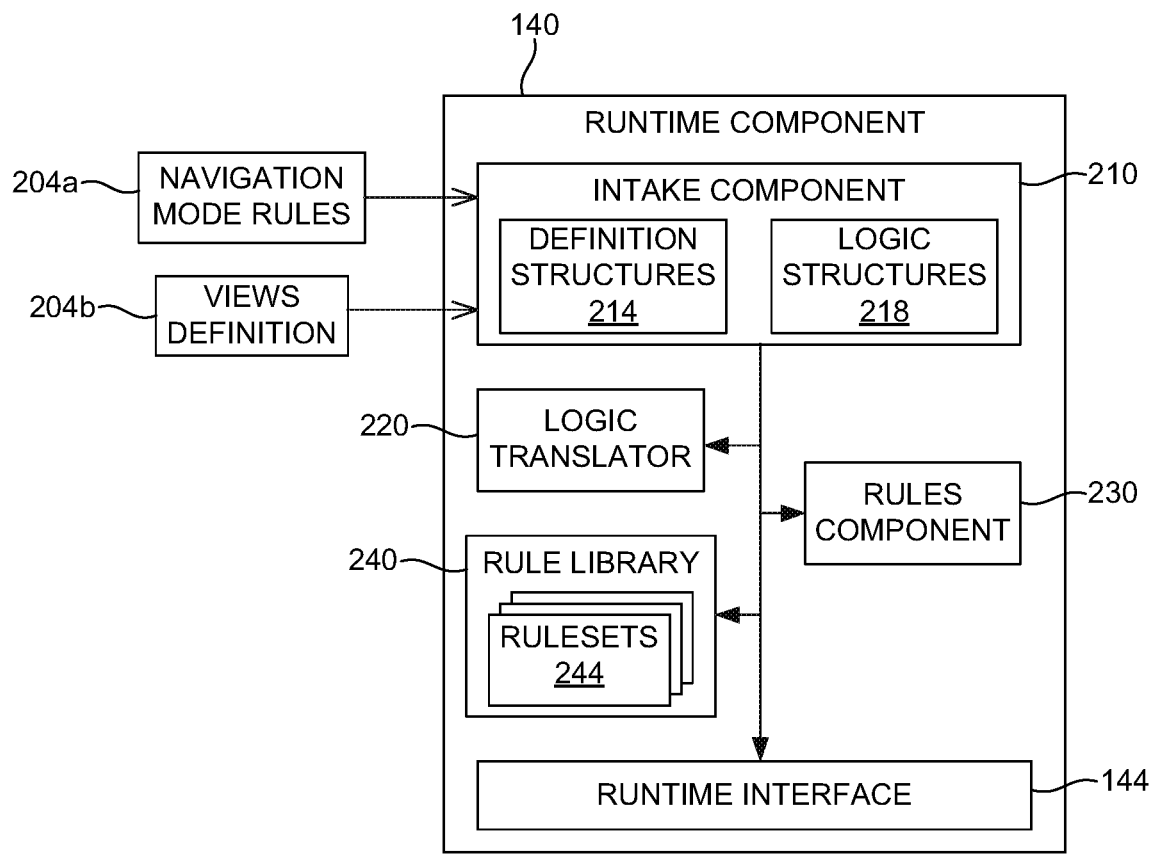
FIG. 2 illustrates an example of a runtime component, in accordance with one or more embodiments of this disclosure.

Rather than being implemented statically, as it typically is the case in existing technologies, a navigation mode can be dynamically defined at runtime of the software application 114. The navigation mode can be defined as a group of rules (referred to as a ruleset). Regardless of its type, a navigation mode can be defined as a ruleset having one or multiple rules. The software application 114 includes a runtime component 140 that can obtain the group of rules in response to execution of the software application 114 being initiated. The group of rules can be obtained from a primary memory device (not depicted in FIG. 1) of the computing device 110. Obtaining the group of rules can include loading or otherwise receiving data defining the group of rules from the primary memory device. As a result, the runtime component 140, and, thus, the software application 114, can be configured according to the navigation mode. More specifically, as is shown in FIG. 2, the runtime component 140 can include an intake component 210 that can obtain a group of rules 204a defining a navigation mode. The group of rules 204a can be obtained in a native format for a rule library 240 contained in the runtime component 140. The intake component 210 can pass or otherwise send the group of rules 204a (or data defining such rules) to the rule library 240.

The runtime component 140 also can obtain definition data defining a series of views (e.g., a questionnaire). The definition data can be included in a configuration files within a configuration package 116 obtained by the computing device 110. The definition data is pictorially represented by as a block with a letter "+D" in FIG. 1. The series of views can be defined in terms of human-readable content formatted according to a core definition language (CDL). For purposes of illustration, CDL refers to is a set of files in specific formats, that define instructions to form views and prompts, and to define logic statements and expressions pertaining to an interactive electronic document. In addition, CDL can be referred to as an interactive electronic document language because each type of file is defined by a grammar and a set of rules. As is described herein, CDL can be represented using JSON for descriptions of an interactive electronic document, and a JSON schema for the grammar of the statements describing the interactive electronic document. The disclosure is, of course, not limited in that respect, and other forms of CDL besides JSON and related JSON schema are contemplated. In some aspects, regardless of its form, CDL can define and rely on codes to identify various types of objects each having one or more attributes. A code uniquely identifies a prompt, text, or another object that constitutes an interactive electronic document. Thus, the code can provide a reference to an internal part of the interactive electronic document.

The definition data can include human-readable content that defines data structures for respective views in the series of views. The human-readable content can be, or can include, NO-CODE statements or LOW-CODE statements, for example. The definition data also can include second human-readable content that defines branching logic for the series of views. The branching logic can include one or multiple statements. An example of a branching logic statement is "if question5.response>5 then GOTO section 3," which represents the following logic: when the response to question five has a value greater than five, proceed to section three in the interactive electronic document. In some cases, the second human-readable content also defines one or more validation conditions and one or more actions. Each one (or, in some cases, at least one) of the actions is responsive to an outcome of at least one of the validation condition(s). An example of an action is presentation of a particular error message based on an outcome of a validation condition. As is shown in FIG. 2, the intake component 210 can obtain definition data 204b defining the series of views. The definition data 204b can include definition structures 214 and logic structures 218. Each one of the definition structures 214 defines a respective view in the series of view (a question in a questionnaire, for example). Each one of the logic structures 218 can define a respective logic statement contained within the views definition 204b. A logic statement refers to either logic or an expression, and can be formatted or otherwise expressed as NO-CODE representation or a LOW-CODE representation of the logic or the expression. A logic statement can be expressed as either an IF-predicate-THEN-Action statement or an IF-predicate- THEN-Action A-ELSE-Action B statement in a LOW-CODE format or NO-CODE format. In cases where a NO-CODE approach is adopted, during composition of the +D constituent of the configuration package 116, a predicate representing the IF portion of a logic statement can be defined by selecting from a preset menu of conditions (e.g., subject is male, subject is nonbinary, subject is Hispanic, etc.) or expressions. For example, the condition "subject is male" can be configured by selecting "gender" from a first menu (e.g., a graphical dropdown menu), then selecting "equals" from the first menu or a second menu, and then selecting "male" from the first menu or yet another menu. Similarly, the action(s) pertaining to the logic statement also can be selected from a preset menu of actions. An Examples of actions in the preset menu of actions can be "grey-out (question n)" and "highlight(question m)." Further because the +D constituent can be updated and then supplied to the computing device 110, as an updated configuration package 116, a logic statement that is defined by the logic structure 218 can be modified as desired, without causing changes to definition of the series of views. In other words, embodiments of this disclosure permit flexibly adjusting various logic associated with a series of views, independently from the definition of the series of views itself.

A logic structure of the logic structures 218 can define, for example, a logic statement directed to branching logic, validation logic, disabling logic, scoring logic, exporting logic or a combination thereof. Branching logic refers to logic that dictates a transition from a current prompt to a next prompt based on a particular condition. Validation logic dictates presence of an invalid response to a prompt based on a particular condition. Disabling logic dictates the exclusion of one or more next prompts based on a particular response to a current prompt. Scoring logic dictates the manner of assessing one or more responses to a group of prompts associated with the series of views. Exporting logic can dictate the manner of exporting responses to prompts and/or other data associated with traversal of the series of views.

Because CDL need not be consistent with the native format of the rule library 240, the branching logic structures 218 may not be formatted according to that native format. Accordingly, the runtime component 140 can include a logic translator component 220 (also referred to as logic translator 220) that can the transform the branching logic structure 218 into a group of rules formatted according to the native format of the rule library 240. The runtime component 140, via the logic translator component 220, for example, can combine (i) the group of rules resulting from the transformation of the branching logic structures 218 and (ii) the group of rules 204a corresponding to the navigation mode desired for traversal of the series of views (e.g., a questionnaire or a consent document). The runtime component 140 can then retain the group of rules that results from such a combination within the rule library 240, as a ruleset of the rulesets 244. The group of combined rules can dictate how an end-user is directed to interact with the series of views. In cases where the series of views corresponds to a questionnaire, the group of combined rules can dictate how an end-user (e.g., a patient, a clinician, or another subject) is directed to answer the questionnaire.

Figure 3:
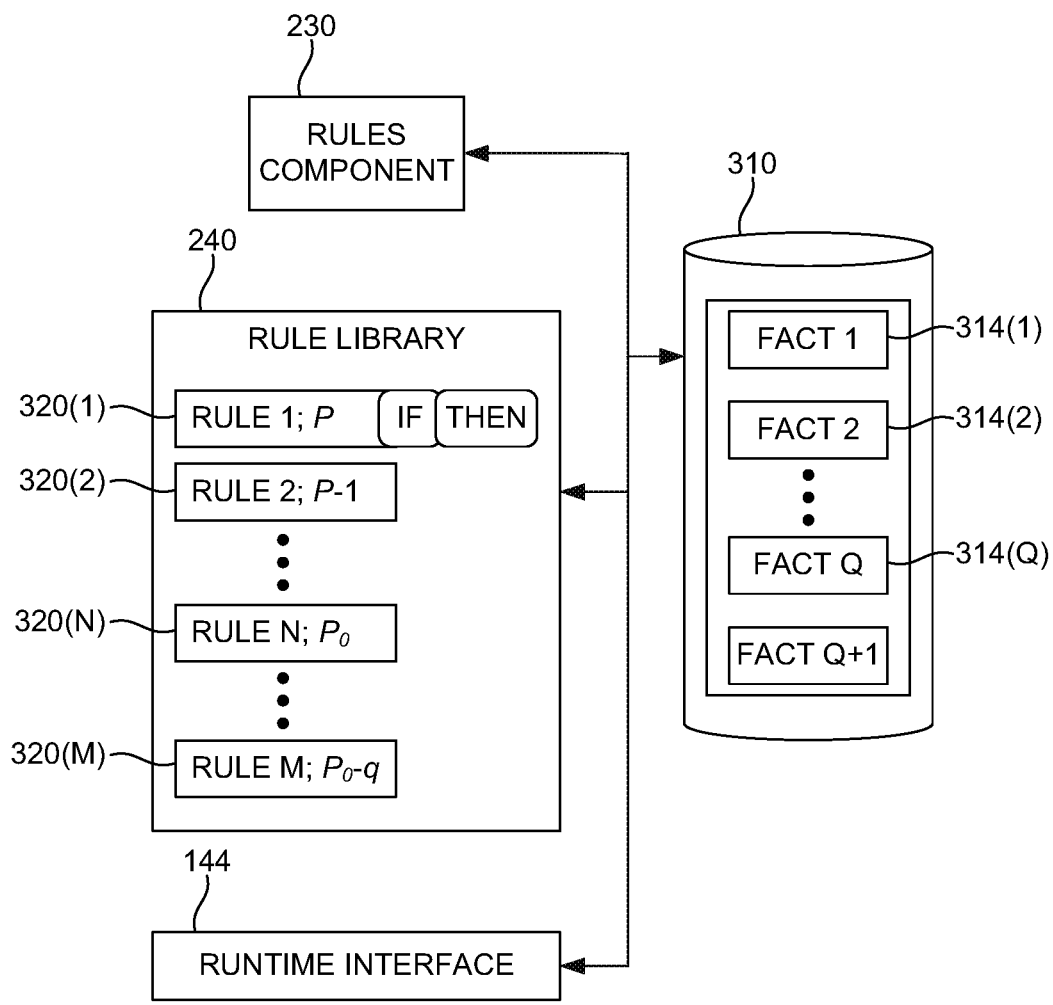
FIG. 3 illustrates elements of a runtime component, in accordance with one or more embodiments of this disclosure.

The definition structures 214 and the particular ruleset that has been configured, at runtime, using the navigation mode rules 204a and the logic structures 218 (obtained from the views definition 204b) can specify the series of views in terms of logic and composition of the series of views. To apply that logic, the runtime component 140 can include a rules component 230 (such as a rules engine) that can access the rule library 240 and can implement (e.g., interpret or otherwise execute) each rule within the particular ruleset. In some cases, in response to implementing one or more rules in the particular ruleset, the rules component 230 can permit one or more navigation mode rules originating in the group of rules 204a to be overridden by the logic structures 218. In such cases, the translated rules from the logic structures 218 can take precedence over the translated rules from navigation mode rules 204a. An example is the branching logic from question $Q_u$ (in case of a questionnaire) indicating that the next question to answer is question $Q_v$ (with v different from u+1) because question $Q_u$ received a "yes" answer. Such a transition overrides the linear mode defining that the subsequent question after $Q_u$ is question $Q_{u+1}$. Implementation of such overriding rules present in the ruleset can, in some cases, cause the implementation of defined actions, such as greying out a section. Thus, an overriding rules may be more than branching logic. In other words, an overriding rule comprise an if-then statement— e.g., in response to a condition statement being satisfied, then perform a defined action. For instance, IF question5.response>7 THEN greyout-section(6), or IF question.6. response>2 THEN next-question(8). FIG. 3 illustrates an example of elements of the runtime component 150 in relation to the operation of the rules component 230, in accordance with one or more embodiments of this disclosure. The rules component 230 can be functionally coupled to data storage 310 containing fact data defining multiple facts that represent a current state of traversal of the series of views. The multiple facts include a first fact 1 314(1), a second fact 2 314(2), and so forth to a Q-th fact 314(Q). For example, a fact of the multiple facts can be a value of a current question (e.g. response-15) in a questionnaire, and another fact of the multiple facts can be an answer to question number 14 (that is, that other fact can be response-14). The rules component 230 also is functionally coupled to the rule library 240. The rules library 240 includes rule data defining the particular ruleset. A rule in the particular ruleset includes an if-then statement. As an illustration the particular ruleset includes M rules having respective priorities: a first rule 1 320(1) having priority P, a second rule 2 320(2) having priority P−1, and continuing up to an N-th rule N 320(N) having priority $P_0$, and so forth up to an M-th rule M 320(M) having priority $P_0$-q. The M rules can be ordered according to decreasing priority; that is, $P>P-1>P_0>P_0$-q.

The rules component 230 can apply a rule in the particular ruleset. The rules component 230 can apply the rules in the particular ruleset in order of priority. Thus, some rules can be applied (or be evaluated) before other rules. In response to the rules components 230 applying a rule in the ruleset, the rules component 230 can evaluate facts defining a current state of traversal of the series of views (e.g., facts 1 314(1) to Q 314(Q)). The facts can be evaluated according to the "if" condition of the if-then statement of the rule being applied. Based on the outcome of the evaluation of such an "if" condition, the "then" action in the if-then statement of the rule being applied can establish one or more new facts (e.g., establish fact 314(Q+1)); remove one or more extant facts; update one or more extant facts; perform another action; navigate to a particular view of the series of views; or perform a combination of the foregoing.

Simply for purposes of illustration, traversal of a questionnaire in linear mode is discussed. As is described herein, the navigation mode rules 204a correspond to the linear mode and can be retained in the rules library 240 as a ruleset including: (i) Rule 1: If the "next button clicked fact is true and there are no validation errors" then update the current question fact to the next question/view. (ii) Rule 2: If the "previous button clicked fact is true" then update the current question fact to the previous question/view. (iii) Rule 3: If the "submit button clicked fact is true and there are no validation errors" then create a "complete" fact. As is further described herein, logic structures within a views definition of the questionnaire can be transformed into one or more native rules for the rules component 230. For example, if a branching logic for question 7 states: "if the response for this question is true, then grey out the rest of the section," the logic translator 220 can then transform such branching logic into a native rule of "if the fact response-7 is true then disable the questions for the rest of the section in the CDL definition structures" Similarly, CDL validation conditions/rules within a view definition of the questionnaire can be transformed into one or more native rules for the rules component 230. For example, if a CDL validation rule states "the value of question 8 needs to be in a range from 1 to 10," the logic translator 220 can then transform such a validation condition/rule into "if the fact response-8 is outside the range from 1 to 10, then add an additional fact validation-failed-8."

Accordingly, the runtime component 140 is isolated from implementation of aspects associated with causing presentation of a UI corresponding to a view of the series of views at a display device 120. To that point, as is shown in FIG. 1, the software application 114 can include a coordination component 150 functionally coupled to the runtime component 140, where the coordination component 150 causes the presentation of the UI (or other UIs, at other times) at the display device. More specifically, the runtime component 140 includes a runtime interface 144 that functionally couples the runtime component 140 to the coordination component 150. The runtime interface 144 exposes or otherwise provides multiple functions (or operations) that, in combination with a particular ruleset, can query and/or can determine the logical state of the series of views, which in turn can control the presentation of the series of views. The multiple functions constitute the core control logic of the runtime component 140. Simply as an illustration, the multiple functions can include a first function configured to get a current view for represent at the display device 120. A call to the first function returns page element(s) and prompt(s) corresponding to the current view. The page element(s) and prompt(s) can be returned as a CDL data structure formatted according to JavaScript objection notation (JSON). The first function may be referred to as Operation Q, simply for the sake of nomenclature.

Continuing with the illustration, the multiple functions also can include a second function configured to pass a response to a prompt (e.g., a questions). A call to the second function passes a response as a particular CDL data structure formatted according to JSON. The second function may be referred to as Operation R, simply for the sake of nomenclature. The multiple functions also can include a third function configured to pass an indication of interaction with a control element. For example, an indication of a navigation icon being selected (clicked or tapped, for example). The third function may be referred to as Operation N, simply for the sake of nomenclature. The multiple functions also can include a fourth function configured to retrieve one or more validation error(s) from a current response to a prompt. For example, an indication of a navigation icon being selected (clicked or tapped, for example). The fourth function may be referred to as Operation V, simply for the sake of nomenclature. The multiple functions also can include a fifth function configured to determine if a particular sequence of views (e.g., an instance of a questionnaire) has been completed. A call to the fifth function can return an indication of an affirmative or negative determination, and also can return one or more responses to prompt(s). The one or more responses can be returned as a particular CDL data structure formatted according to JSON. The fifth function may be referred to as Operation C, simply for the sake of nomenclature.

The coordination component 150 can include an execution component 154 that can execute function calls to one or more of the multiple function calls exposed by the runtime interface 144. In response to execution of the function calls, the coordination component 150 can direct a presentation component 150 to draw a UI (e.g., one of the UIs 130) at the display device 120. The presentation component 150 is part of the application 114, and includes a library interface 164 that provides the functional coupling between the presentation component 150 and the coordination component 140. The presentation component 150 can include a UI element library 166 having multiple UI elements 168. The UI elements 168 include at least one presentation element and at least one navigation control element (also referred to as control element in this disclosure). Presentation elements pertaining to the UI elements 168 can include, for example, various type of digital content, such as still images (e.g., icons, avatars, pictures of subjects, and the like); animations; video segments; audio segments; ringtones; electronic documents (e.g., literature and/or presentations in portable digital format (PDF)); and the like. In some cases, simply as an illustration, the UI element library 166 can be a React UI library. In other cases, the UI element library 166 can be a custom library or a native library (e.g., a UI library of the operating system (O/S) of the computing device 110, such as iOS or Android for example).

To cause presentation of a view of the series of views, the coordination component 150, via the execution component 154, for example, can execute a function call to the first function (Operation Q) to obtain the view. As mentioned, the view is defined in terms of data structures formatted according to CDL. The execution component 154 can then implement translation logic 156 to map a first data structure of the data structures to a prompt (e.g., a question in a questionnaire or a consent statement in a liability waiver). The translation logic 156 can be defined within a configuration file within the configuration package 116. The translation logic 156 is pictorially represented by as a block with a letter "+T" in FIG. 1. The prompt can be defined in a desired natural language (e.g., English, Italian, or Spanish) for the series of views. Accordingly, a mapping that constitutes the translation logic 156 can be defined to transform data structures in CDL to the desired natural language. More specifically, to implement the translation logic 156, the execution component 154 can determine that a translation rule is satisfied for a particular view of the series of views. In response, the execution component 154 can translate a first natural language statement associated with the prompt and presented in a first natural language to a second natural language statement in a second natural language. The translation can be accomplished by identifying the first natural language statement and then applying the mapping to associate the first natural language statement to the second natural language statement.

Additionally, the execution component 154 also can implement layout logic 158 to determine one or more UI elements to be presented in a UI corresponding to the view, at the display device 120. The layout logic 158 can be defined within a configuration file within the configuration package 116. The layout logic 158 is pictorially represented by a block with a letter "+L" in FIG. 1. In response to implementing the layout logic, the execution component 154 can direct, via the library interface 164, the presentation component 160 to obtain the one or more UI elements and draw the one or more UI elements in a defined layout of areas in the UI corresponding to the view.

Simply as an example, FIG. 1 presents a UI 132 corresponding to a view of the series of views. The UI 132 can include a presentation element 134 representing a prompt pertaining to the view. The presentation element 134 can include, for example, text or other indicia representing the prompt. The text, for example, can be formatted according to a particular font type and font size configured by the layout logic 158. Indeed, not only can the layout logic 158 permit formatting of a font, but the layout logic 158 also can permit alignment of text on the UI 132 screen, including Right to Left display options. The prompt can be a natural language statement (such as a question) in a particular natural language. The UI 132 also can include a control element 136. The control element 136 is selectable and can permit receiving input data responsive to the prompt. The UI 132 can further include navigation elements 138 (represented by arrow marks).

As mentioned, the UI that is presented and corresponds to a view can include a prompt and a control element that permits an end-user to interact with the UI. Accordingly, the presentation component 160 can receive input data 118 in response to interaction with the UI. It is noted that the input data 118 flows in one direction towards the application 114, with the receipt of the input data 118 at the presentation component 160 being represented as an arrow towards the presentation component 160 from the block labeled "118." In some cases, the input data 118 can include response data responsive to the prompt—e.g., input data 118 can be indicative of an answer to a question that is part of an eCOA. Such response data can be referred to as prompt response data. The presentation component 160 can pass the input data 118 including the prompt response data to the coordination component 150 via the library interface 164. The execution component 154 can receive the input data 118 including the prompt response data, and can then execute a function call (Operation R) to send (or pass) the input data 118 to the runtime component 140. As is described herein, the input data 118 including the prompt response data can be sent in JSON format.

In other cases, rather than including prompt response data within the input data 118, the input data 118 can include navigation response data responsive to selection of a control element (e.g., a navigation control) within a UI corresponding to a view. As is described herein, the input data 118 that include the navigation response data can be sent in JSON format. The presentation component 160 can receive the input data 118 including the navigation response data. The presentation component 160 can then send (or pass) the navigation response data to the coordination component 150 via the library interface 164. The execution component 154 an receive the signaling, and can then execute a function call (Operation N) to send the signaling to the runtime component 140.

Figure 4A:
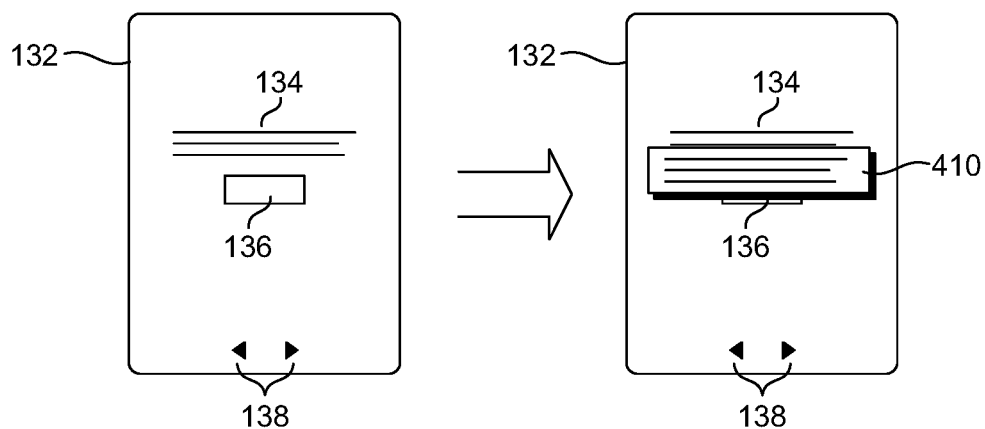
FIG. 4A illustrates examples of user interfaces, in accordance with one or more embodiments of this disclosure.
Figure 4B:
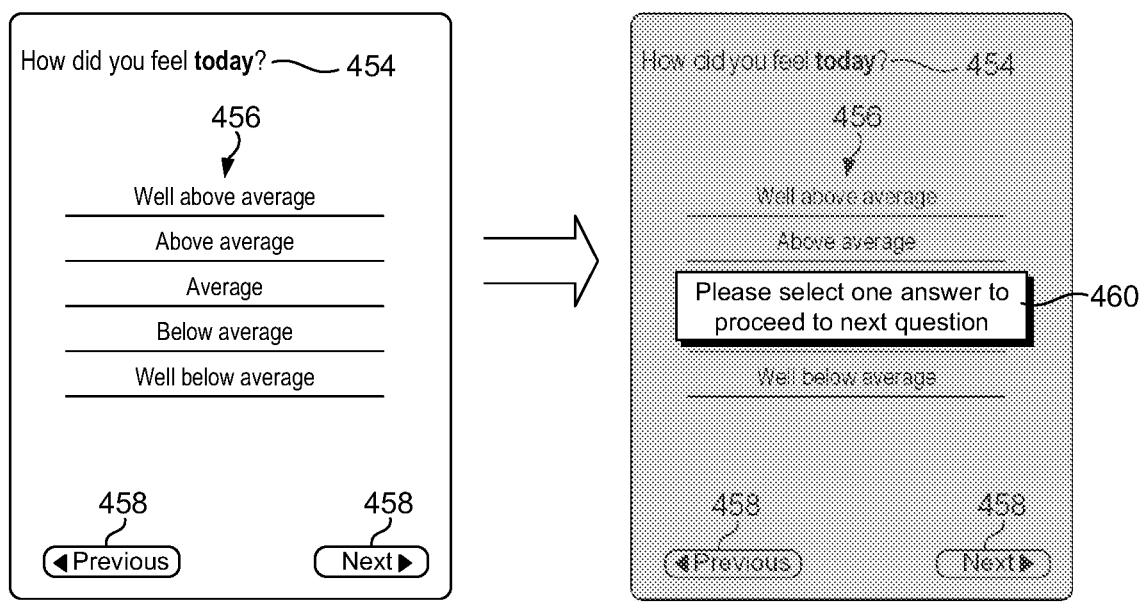
FIG. 4B illustrates other examples of user interfaces, in accordance with one or more embodiments of this disclosure.

The runtime component 140 has access to branching logic and/or validation condition(s), and can operate on the input data 118. Such operation may yield an error. Accordingly, the execution component 154 can execute another function call (Operation V) to obtain any validation errors that may be present in response to the runtime component 140 operating on the input data 118. In case a validation error is present, the execution component can receive a CDL data structure identifying an error view. The execution component 154 can then direct the presentation component 160 to draw one or more UI elements indicative of the error. As is illustrated in FIG. 4A, in some cases, the presentation component 160 can redraw the UI 132 to include a single UI element 410 corresponding the error view. The UI element 410 can be presented as an overlay and can include text (represented with line segments) indicative of the validation error. In some cases, instead of presenting an overlay, the UI element 410 can be integrated into the UI 132. Further, or in other cases, besides including the UI element 410, the presentation component 160 can change the appearance of a section of the redrawn UI 132. For example, the UI 132 can be redrawn to include a grey layer that is translucent and covers at least a portion of the UI 132, and the UI element 410 as an overlay. FIG. 4B presents an example of another sequence of user interfaces where an error view is involved in the presentation of one of the user interfaces. More specifically, a UI 450 can present a prompt 454 and multiple selectable UI elements 456 representing a group of possible answers. The UI 450 also includes a first navigation control 458a and a second navigation control 458b. In response to the navigation control 458b being selected, the execution component 154 can direct the presentation component 160 to redraw the UI 450 with a grey pane, that can be translucent, overlaying the UI 450, and also to draw a UI element 460 as an overlay. The UI element 460 represents the error view.

Figure 5:
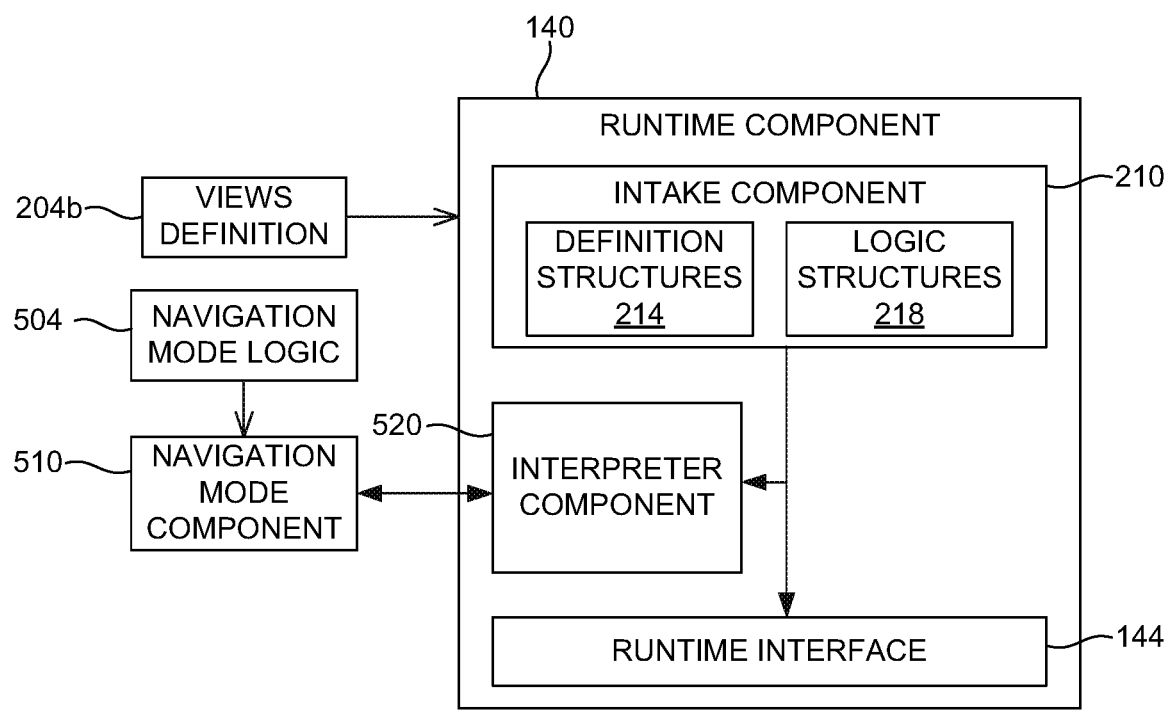
FIG. 5 illustrates elements of a software application, in accordance with one or more embodiments of this disclosure.

Embodiments of this disclosure are not limited to defining a navigation mode as a set of rules and relying on a rules component (such as rules component 240 (FIG. 2)). As is illustrated in FIG. 5, instead of obtaining navigation mode rules 204a, the runtime component 140 can select program code defining the navigation mode. To that end, the runtime component 140 can be functionally coupled to a navigation mode component 510. The navigation mode component 510 can execute navigation mode logic 504 corresponding to a navigation mode into program code defining the navigation mode. Indeed, the navigation mode component 510 can execute various types of navigation mode logic 504 corresponding to respective navigation modes. Accordingly, the runtime component 140 can select the program code by selecting an implementation of the navigation model logic 504 that can be executed by the navigation mode component 510. The implementation of the navigation model logic 504 can be embodied in an instance of the navigation mode component 510.

The runtime component 140 can include an interpreter component 520 that, at runtime, can obtain (e.g., load) particular program code defining a particular navigation mode to be used to traverse a questionnaire. The particular program code can be obtained (e.g., loaded) via the navigation mode component 510. Additionally, also at runtime, the interpreter component 520 can obtain multiple logic structures 218. As is described herein, at runtime, the intake component 210 can obtain the logic structures 218 from a views definition 204b, and can supply the logic structures 218 to the interpreter component 520. The interpreter component 520 can then directly execute both the particular program code defining the navigation mode for the series of views and the logic structures 218 defining, for example, the branching logic for the series of views. As mentioned, the logic structure 218 may not be limited to including logic statements that define branching logic. Indeed, in some cases, the logic structure 218 can include logic statements that define one or more of validation logic, disabling logic, scoring logic, or export logic.

For a defined series of views (e.g., a questionnaire), the computing device 110 can obtain a views definition (e.g., views definition 204b), translation logic (e.g., translation logic 156), and layout logic (e.g., layout logic 158) via the configuration package 116. The computing device 110 can receive the configuration package 116 from another computing device remotely located relative to the computing device 110. The configuration package can be received in response to executing the application 114 or a time of installed the application 114. To that end, in some cases, execution of the application 114 can cause presentation of selection prompt to select a particular natural language from a group of natural languages available in the configuration package to be uploaded or otherwise received. The other computing device remotely located relative to the computing device 110 can generate the configuration package in response to such a selection.

The configuration package can include three sets of configuration files, where each set has at least one configuration file and defines an aspect of the series of views. Each configuration file can be defined in terms of CDL. A first aspect is directed to a definition of the series of views. The set of configuration files pertaining to the definition aspect (also referred to as "+D" aspect) includes a single configuration file that can describe each view, branching logic (and, in some cases, scoring logic), and validation conditions. That single configuration file can be generated by configuring each view (or part) individually, in a respective working file, for example, and then consolidating the multiple views (or parts) into a the single configuration file. That single configuration file can be referred to as CDL+D configuration file and can be denoted as CDL+D. The CDL+D configuration file also can define a response format for responses to a prompt (e.g., a question) within a view. A second aspect is directed to translation of views described in the CDL+D configuration file into a target natural language. The set of configuration files pertaining to the translation aspect (also referred to as "+T" aspect) can include multiple files, each corresponding to a desired natural language. A +T configuration file defines a translation mapping. A +T configuration file can be referred to as CDL+T configuration file and can be denoted as CDL+T. A third aspect is directed to layout of UIs corresponding to respective views described in the +D configuration file. The set of configuration files pertaining to the layout aspects (also referred to as "+L" aspect) can include multiple files, each corresponding to a UI layout for a particular type of display device and a particular UI library associated with a computing device, such as the computing device 110. The particular UI library can be one of multiple UI libraries available to the computing device (e.g., a smartphone or a tablet computer). A +L configuration file defines layout logic. A +L configuration file can be referred to as CDL+L configuration file and can be denoted as CDL+L.

Figure 6A:
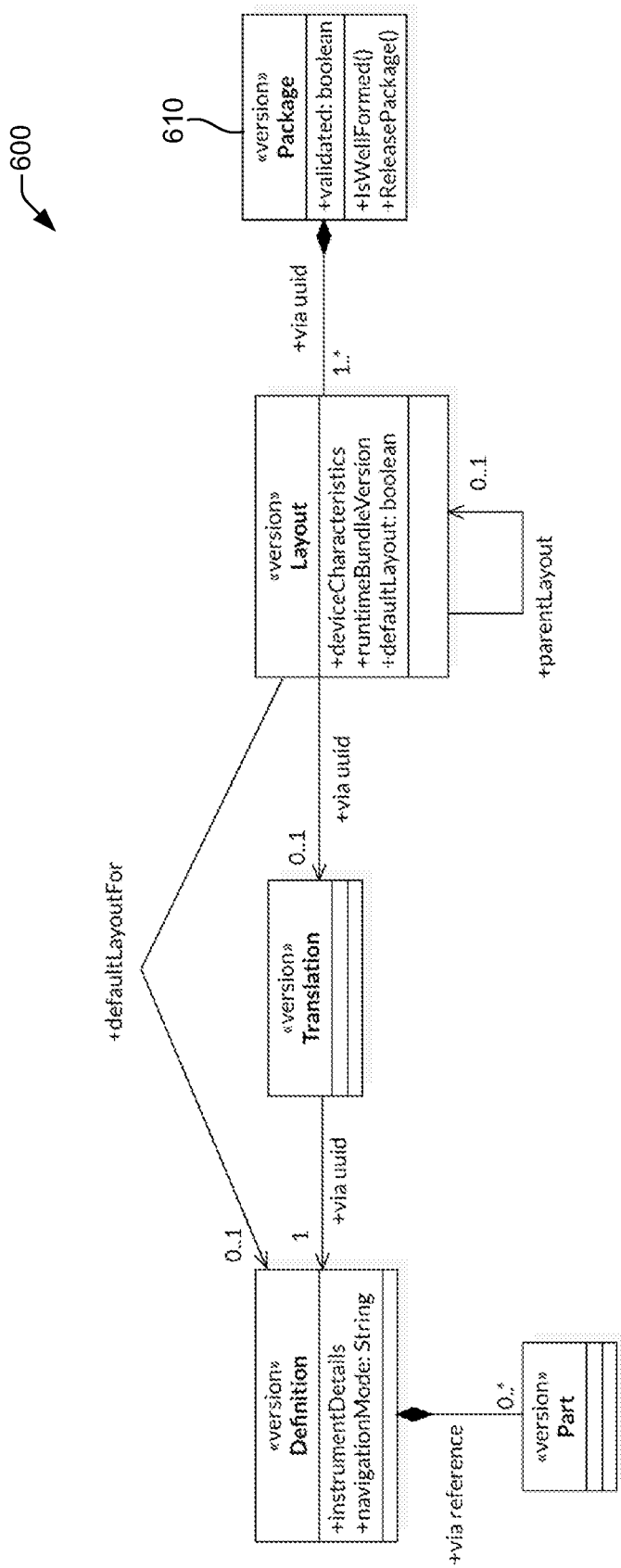
FIG. 6A illustrates a class diagram representing a model of a configuration package, in accordance with one or more embodiments of this disclosure.

A class diagram 600 representing a model of configuration package 610 is shown in FIG. 6A. The configuration package 610 includes one or multiple CDL+L configuration files, one or multiple CDL+T configuration file, and a single CDL+D configuration file. A CDL+L configuration file depends from a CDL+T configuration file, and the CDL+T configuration file depends from the CDL+D configuration file. The particular dependency structure of CDL+D, CDL+T, and CDL+L configuration files can isolate the implementation of validation processes in response to changes to one or more of those configuration files. In some embodiments, such changes can be implemented while a configuration file is in a working state, as opposed to an immutable state. The working state refers to a condition of the configuration file that is mutable and permits revisions to that file. The immutable state refers to a condition of the configuration file that is immutable and has a perennial version assigned to that file. The perennial version can be identified using a perennially unique identifier that is formatted according to a desired versioning schema. In the working state, a change to a CDL+L configuration file may cause a validation process for that file only. A change to a CDL+T configuration file causes a validation process for each CDL+L configuration file that depends from the changed CDL+T file. A change to a CDL+D configuration file causes a validation process for the CDL+T configuration file(s) depending from the CDL+D configuration file, and also causes a validation process for the CDL+L configuration file(s) depending from a CDL+T configuration file. The Part structure is a modular data structure that defines various elements of a series of views in terms of section, view, and prompt. Multiple Parts can be configured individually, in respective working files, for example, and can then be consolidated into a single CDL+D configuration file, as mentioned.

Figure 6B:
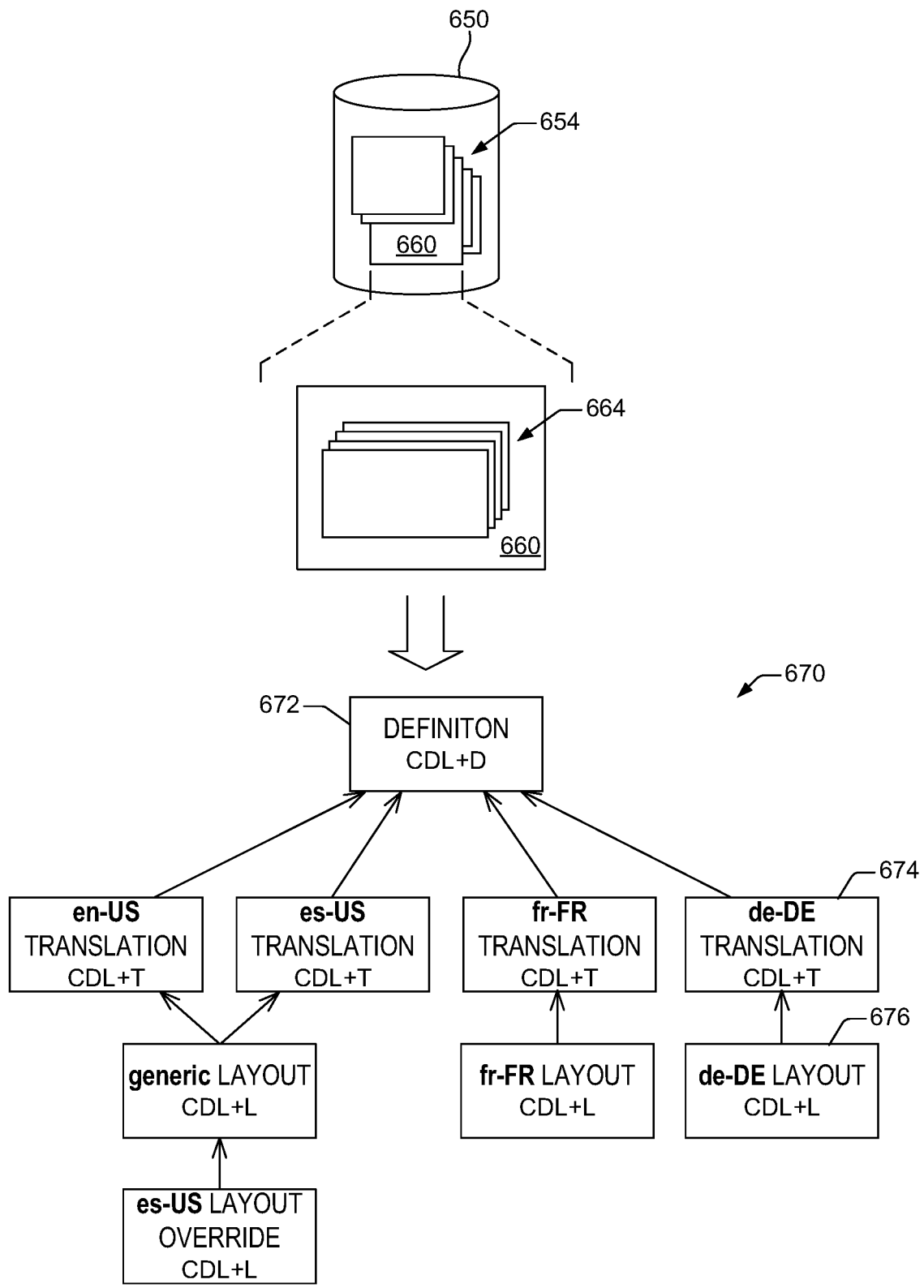
FIG. 6B illustrates a representation of an example of a configuration package, in accordance with one or more embodiments of this disclosure.

FIG. 6B illustrates a data repository 650 containing multiple configuration packages 654, a diagram 670 representing a model of an instance of a configuration package 660 containing multiple configuration files 664 of +D, +T, and +L types. It is noted that, as is shown in the diagram 670, a single CDL+D configuration file 672 is present in the instance of the configuration package 660, and for that single CLD+D configuration file 672 there are multiple CDL+T configuration files associated therewith, and there are also multiple CDL+L configuration files associated with the multiple CDL+T configuration files in various ways. Indeed, in some embodiments, each one of the configuration packages 654 can have a single CDL+D configuration file, one or more CDL+T configuration files, and one or more CDL+L configurations files, where such configuration files can be related in the manner shown in the class diagram 600 in FIG. 6A.

Figure 7:
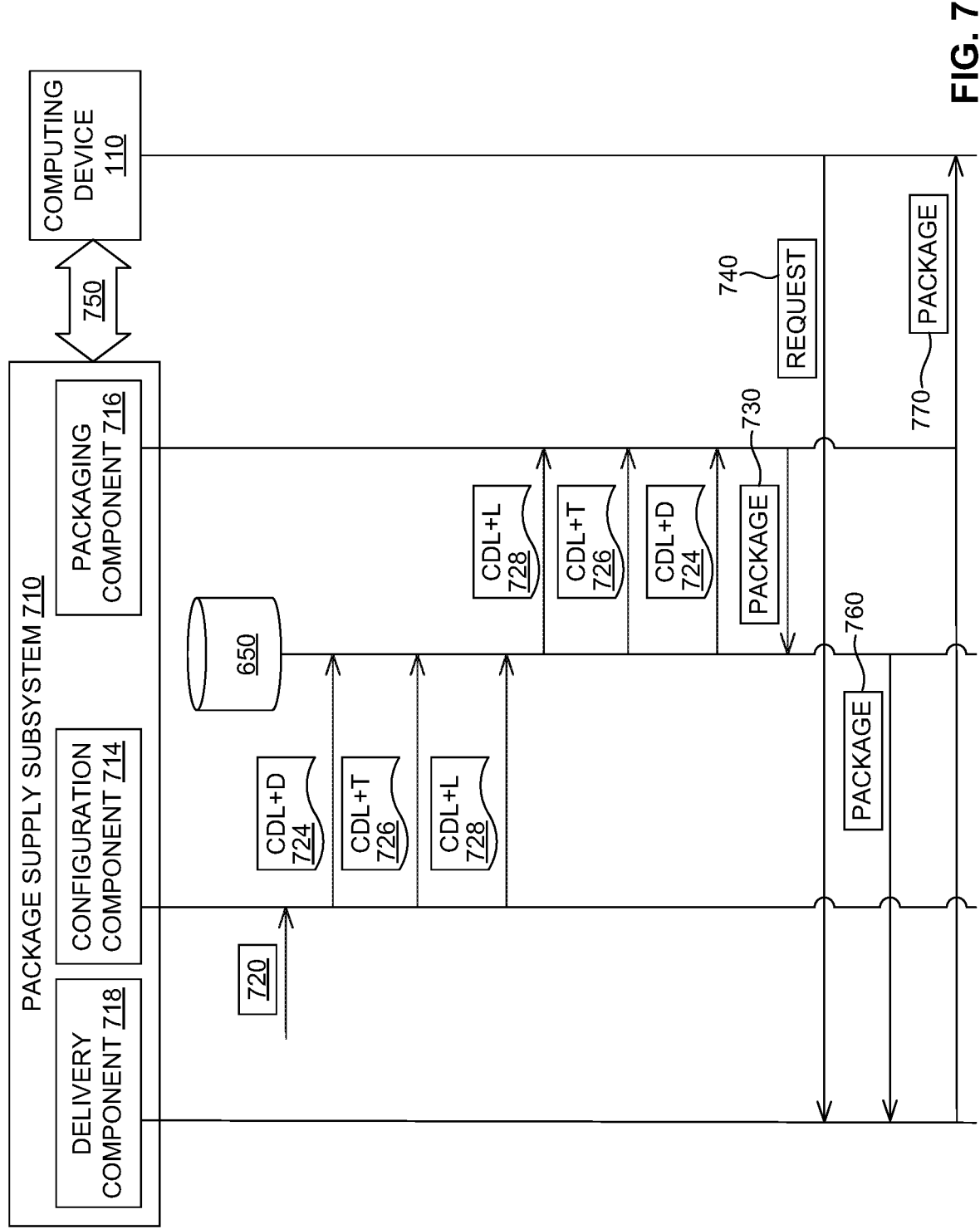
FIG. 7 illustrates an example of a process flow for supplying a configuration package, in accordance with one or more embodiments of this disclosure.

FIG. 7 illustrates an example of a process flow for supplying a configuration package, in accordance with one or more embodiments of this disclosure. Supplying the configuration package can include generating the configuration package and sending the configuration package to a computing device. In the exemplified process flow, a configuration component 714 can receive input data 720. The configuration component 714 can be part of a package supply subsystem 710. In some cases, the configuration component 714 can be hosted by a computing device (not depicted in FIG. 7) included in the package supply subsystem 710. The input data 720 can include first data defining the content of a CDL+D configuration file 724. In response to receiving the first data, the configuration component 714 can generate the CDL+D configuration file 724 within the data repository 650. The CDL+D configuration file 724 can be generated in a filesystem present in the data repository 650. As part of generating the CDL+D configuration file 724, the configuration component 714 can generate a UI a unique identifier and can incorporate the unique identifier into the CDL+T configuration file 726. The unique identifier can be used to reference the CDL+D configuration file 724 from another configuration file. An example of the unique identifier is a universally unique identifier (UUID).

In addition, or in some cases, the input data 720 also can include second data defining the content of a CDL+T configuration file 726. In response to receiving the second data, the configuration component 714 can generate the CDL+T configuration file 726 within the data repository 650. The CDL+T configuration file 726 can be generated in the filesystem present in the data repository 650. As part of generating the CDL+T configuration file 726, the configuration component 714 can generate a unique identifier and can incorporate the unique identifier into the CDL+T configuration file 726. That unique identifier (e.g., a UUID) can be used to reference the CDL+D configuration file 724 from another configuration file. In some cases, each of the text values included in the CDL+T configuration files can support markdown (Headings, Paragraphs, Newlines, Emphasis, for example), so that font and/or highlighting can be customized.

Moreover, or in yet other cases, the input data 720 also can include third data defining the content of a CDL+L configuration file 728. In response to receiving the third data, the configuration component 714 can generate the CDL+L configuration file 728 within the data repository 650. The CDL+L configuration file 728 can be generated in the filesystem present in the data repository 650. As part of generating the CDL+L configuration file 728, the configuration component 714 can generate a unique identifier and can incorporate the unique identifier into the CDL+L configuration file 728. That unique identifier (e.g., a UUID) can be used to reference the CDL+D configuration file 724 from another configuration file. As is illustrated in FIG. 6A, a definition of a CDL+L configuration file can specify a version of a runtime bundle corresponding to the runtime component 140, coordination component 150, and the presentation component 160 that is suitable for use with a configuration package that includes the CDL+L configuration file. The version can be identified via a UUID, for example. Additionally, the CDL+L configuration file can include a reference or another type of link to that version of the runtime bundle. The configuration component 714 can thus apply one or more integrity tests to the CDL+L configuration file 728 against one or several versions of the UI element library 166. Versioned runtime bundles can be retained in an archive within the data repository 650. In this way, the configuration component 714 can determine that the CDL+L configuration file (and a configuration package that incorporates such a file) can be utilized in a version of the runtime component 140 for which the CDL+L configuration file has been tested with. Accordingly, validated behavior for the configuration package can be maintained for a desired runtime bundle.

As is illustrated in FIG. 7, the package supply subsystem 710 also includes a packaging component 816. In some cases, the computing device (not depicted in FIG. 7) that hosts the configuration component 714 also can host the packaging component 816. The packaging component 716 can obtain the CDL+L configuration file 728, the CDL+T configuration file 726, and the CDL+D configuration file 724 and can generate a configuration package 730 within the data repository 650. The packaging component 816 can retain the configuration package 730 in the filesystem present in the data repository 650. That filesystem also can include various configuration files (CDL+D, CDL+T, and CDL+T files). The package 730 can be one of the packages 654 retained in the data repository 650, for example.

In order to obtain a configuration package, the computing device 110 can send, to the package supply subsystem 710, a request 740 for a particular combination of interactive electronic document, natural language, and type of device and display resolution. Such a particular combination resolves to a particular CDL+L configuration file. The interactive electronic document can include a questionnaire, a consent document, an assessment, or an independent-task guide (e.g. an installation guide or a troubleshooting guide), for example. In some cases, the computing device 110 can send the request 740 in response to initiating execution of the application 114 (not shown in FIG. 7). The request 740 can be sent by means of a communication system 750. The communication system 140 can include one or a combination of networks (wireless or wireline) that permit two-way communication of data and/or signaling.

A delivery component 718 that is included in the package supply subsystem 710 can receive the request 740. In some cases, the computing device (not depicted in FIG. 7) that hosts the configuration component 714 and the packaging component 716 also can host the delivery component 718. In other cases, a second computing device (not depicted in FIG. 7) can host the delivery component 718. In response to receiving the request 740, the delivery component 718 can select a configuration package 760 that satisfies the requested particular combination of interactive electronic document, natural language, and type of device and display resolution. The configuration package 760 can be selected from the group of packages 654 within the data repository 650. The configuration package 760 can include several configuration files, where a particular set of configuration files—CDL+D, CDL+T, and CDL+L configuration files—corresponds to the requested particular combination of electronic interactive document, natural language, and type of device and display resolution. As such, the delivery component 718 can generate a deliverable configuration package 770 by extracting the particular set of configuration files, and then composing the deliverable configuration package 770. To that end, the delivery component 718 can analyze language defining type of device and display resolution for several CDL+L files. Such analysis can yield an CDL+L file appropriate for the type of device and display resolution. Additionally, the delivery component 718 can determine, within the appropriate CDL+L file, a reference to a CDL+T file. The CDL+T file can be appropriate for the natural language. Similarly, the delivery component 718 can determine, within the CDL+T, a reference to a CDL+D file, where the CDL+D file defined the electronic interactive document. The configuration package 770 can be referred to as "minimal package" in that the configuration package 770 contains the configuration files that are relevant to an applicable interactive electronic document, a desired natural language, and particular type of computing device with particular UI characteristics/attributes. The delivery component 718 can send the configuration package 770 to the computing device 110 by means of the communication system 770.

Simply as an illustration, the configuration package 760 can be the configuration package 660 depicted in FIG. 6B, which package includes the configuration files shown in the tree structure 670. The delivery component 718 can determine that the CDL+D configuration file 672, the CDL+T configuration file 674, and the CDL+L configuration file 676 form the set of files that correspond to the requested particular combination of interactive electronic document, natural language, and type of device and display resolution. Accordingly, the deliverable configuration package 770 includes the CDL+D configuration file 672, the CDL+T configuration file 674, and the CDL+L configuration file 676.

By implementing the example process flow shown in FIG. 7, embodiments of this disclosure can deterministically deliver a portion of a configuration package—that portion being the deliverable configuration package 770—to a device and for a desired natural language. The portion of the configuration package that is delivered is appropriate for the device and the natural language in that the interactive electronic package can be adequately presented (e.g., without visual artifacts) at the device, in the desired natural language. Such a determinism and adequacy renders such an example process flow superior to existing technologies for providing an interactive electronic document.

Figure 8A:
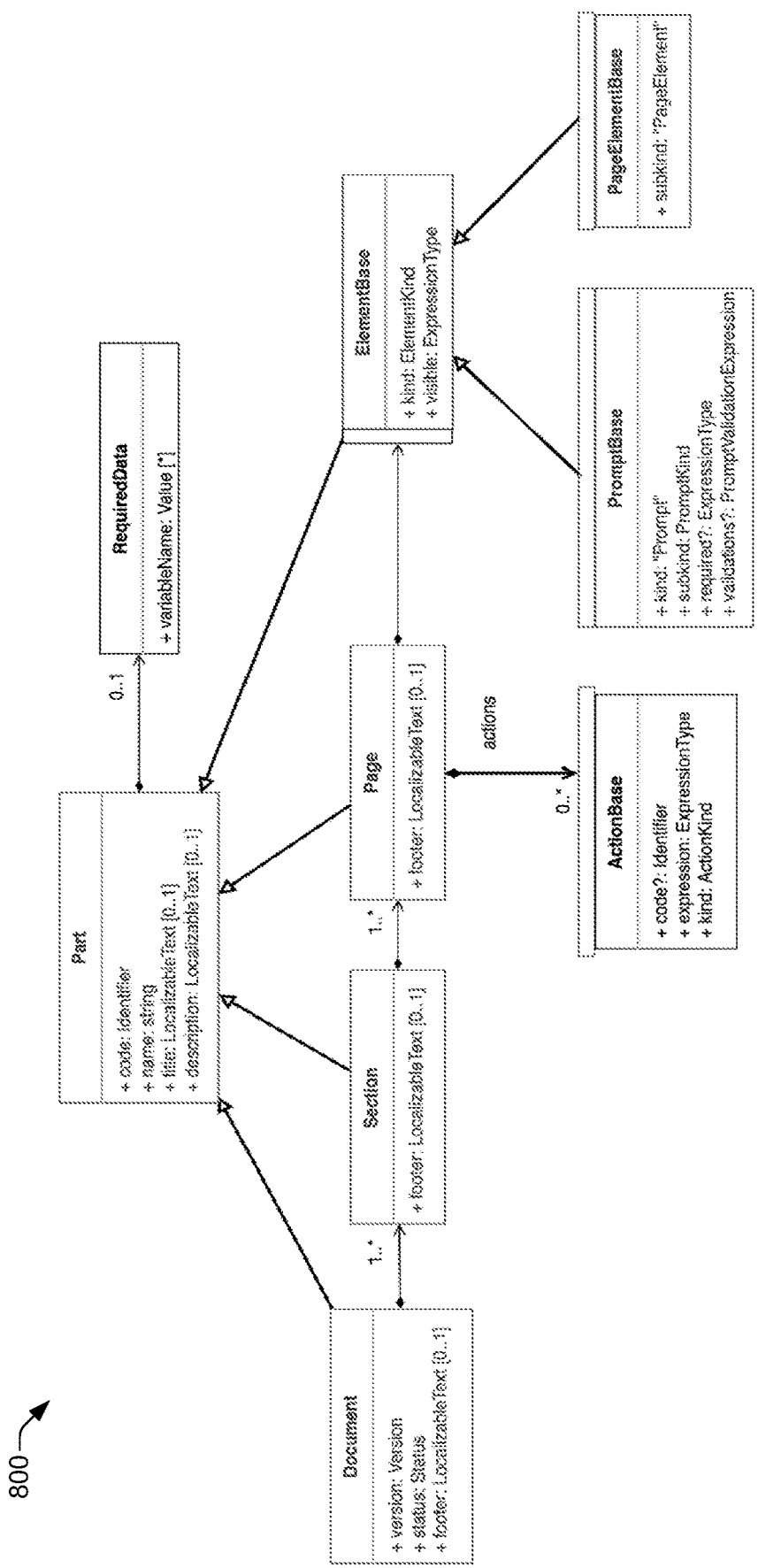
FIG. 8A illustrates a data structure that composes a views definition included in a configuration package, in accordance with one or more embodiments of this disclosure.
Figure 8B:
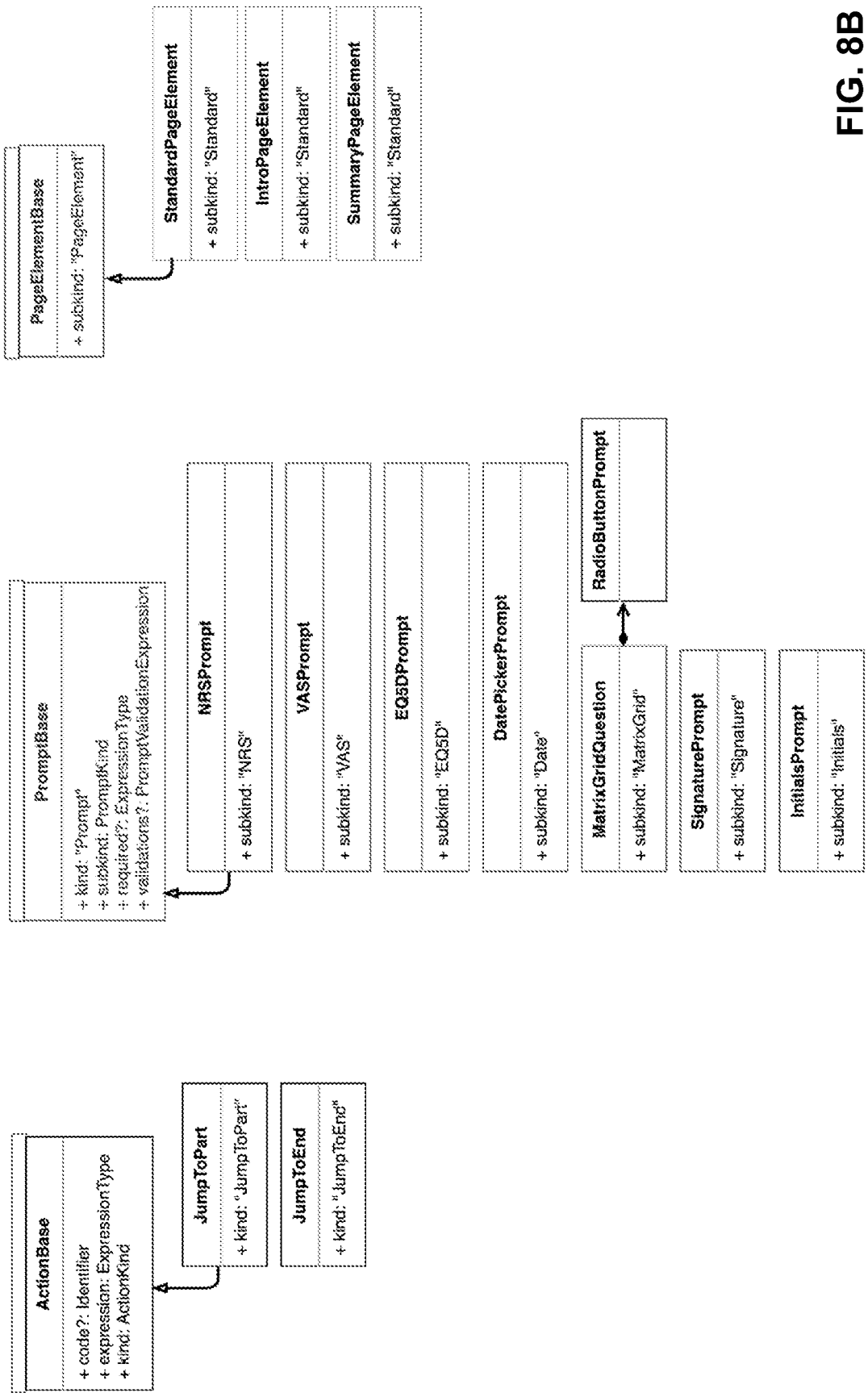
FIG. 8B illustrates examples of inheritances present in the data structure shown in FIG. 8A, in accordance with one or more embodiments of this disclosure.

An example of a Part that is applicable to an interactive electronic document is shown in the class diagram 800 shown in FIG. 8A. Here, Part permits a modular approach to creating an interactive electronic document from self-contained sections, pages, and/or elements. The interactive electronic document is itself a Part. Inheritances associated with ActionBase, PromptBase, and ElementBase in the class diagram 800 are shown in the inheritance diagram 850 in FIG. 8B. In one example, the interactive electronic document is a questionnaire. As is described herein, in some cases, a Part that constitutes an interactive electronic document can be generated individually and can be retained in a respective working file, as is described herein. A Part is a modular part of the interactive electronic document corresponding to a section, a page, or an isolated element. Various Parts forming the interactive electronic document can then be consolidated into a single CDL+D configuration file, as is also described herein.

As is illustrated in FIG. 8A, the ElementBase can inherit from Part. In turn, both PromptBase and PageElementBase can inherit from the ElementBase. Here, the PromptBase class defines a prompt of a particular type from a group of types. Such a prompt can be shown in a UI as a presentation element that is selectable. Additionally, the PageElementBase class defines a visual element that can be shown in a UI as a presentation element that is either selectable or non-selectable. Simply for the sake of illustration, Table 1 illustrates example of questions types that can be utilized in the definition of a questionnaire in accordance with aspects described herein.

TABLE 1

| Prompt Type | Description |
| --- | --- |
| NRS | The NRS is a prompt (e.g., question) that displays to the user a scale of buttons arranged horizontally, each button displaying a number, out of which one single option can be selected. The number of buttons is variable. The scale should have optional anchors with certain descriptions on any of the elements. |
| Horizontal Slider (VAS) | The Horizontal Slider is a prompt (e.g., question) that displays to the user a horizontal slider where the user can input a certain value. Minimum and maximum values are configurable and clearly visible on the screen. It is easy for the user to do small adjustments to the selected value. |
| Vertical Slider (referred to as EQ5D in FIG. 8B) | The Vertical Slider is a prompt (e.g., question) that displays to the user a vertical slider where the user can input a certain value. Minimum and maximum values are configurable, the value selected by the user is clearly visible on the screen. In some cases, the end-user can make small adjustments to the selected value. |
| VRS | The VRS is a prompt (e.g., question) that displays to the user multiple buttons, arranged vertically, each button displaying a text, out of which one single option (e.g., button) can be selected. |
| Multiple Answer - Checkboxes | The Multiple Answer prompt (e.g., question) displays to the user multiple checkboxes, arranged vertically, each checkbox displaying a text, out of which one or more options can be selected. Additional functionalities are sometimes available for this question type, like one option clearing any other selection. |

TABLE 1-continued

| Prompt Type | Description |
| --- | --- |
| Date Entry | The Date Entry is a prompt (e.g., question) that collects from the user a date, using the existing DatePicker control. |
| Time Entry | The Time is a prompt (e.g., question) that collects from the user a date, using the existing TimePicker Scrollable control. |
| DateTime Entry | The DateTime Entry is a prompt (e.g., question) that collects from the user a date and time, using the existing DatePicker and TimePicker Scrollable controls. |
| Number Entry | The Number Entry is a prompt (e.g., question) that collects from the user a number using the existing control. |
| Free Tex | The Free Text Entry is a prompt (e.g., question) that collects from the user a string value using a standard text box control. |
| Matrix Grid | The Matrix Grid is a prompt (e.g., question) that collects from the user answers to a number of prompts (e.g., questions) following the same codelist. The Matrix Grid Screen may be available for in-clinic applications, in some cases. |
| Faces | Faces is a prompt (e.g., question) that displays to the user multiple faces, arranged horizontally, each face displaying a text, out of which one single option (face) can be selected. |
| Drop Down Selection | The Drop Down Selector is a prompt (e.g., question) that displays to the user a drop down select having configurable values. |
| RadioButtons | The RadioButtonScreen is a prompt (e.g., question) that displays to the user multiple radio buttons, arranged vertically, each option displaying a text, out of which one single option can be selected. |
| Joint Count | Image of part of body of a subject with particular joints (e.g., finger joints) that can be marked up. |
| Body Image Map | An image of body that serves to mark areas of specific intensity of a symptom (such as pain). |
| Initials | The Initials prompt can be a selectable visual element (e.g., a field, a line, or a box) that can be filled using input data from an end-user to convey name initials of the end-user. |
| Signature | The Signature prompt can be a selectable visual element (e.g., a field, a line, or a box) that can be filled using input data from an end-user to convey a signature of the end-user. |

Simply as further illustration, Table 2 illustrates an example of a data model for answered questions or other types of prompts. Such data model is a definition of the format of data that is expected to be obtained in response to a questionnaire, for example. Each questions or prompt—can retain data in a specific, known, pre-defined format (e.g. a DateTime entry question would always save a datetime value, a Free Text Entry question would always save a string value).

TABLE 2

| Question Type | Data Model |
| --- | --- |
| NRS | A single codelist value corresponding to the selected value. |
| Horizontal Slider (VAS) | A single numeric value corresponding to the selected value. |
| Vertical Slider (referred to as EQ5D in FIG. 8B) | A single numeric value corresponding to the selected value. |
| VRS | A single codelist value corresponding to the selected value. |
| Multiple Answer - Checkboxes | An array of codelist values corresponding to the selected value(s). |
| Date Entry | A single date value corresponding to the inputted value. |

TABLE 2-continued

| Question Type | Data Model |
|---|---|
| Time Entry | A single time value corresponding to the inputted value. |
| DateTime Entry | A single datetime value corresponding to the inputted value. |
| Number Entry | A single numerical value equal with the inputted value. |
| Free Tex | A string value equal to the inputted value. |
| Matrix Grid | An array of answers. Each answer represents a single codelist value corresponding to the question displayed. |
| Faces | A single codelist value corresponding to the selected face. |
| Drop Down Selection | A single codelist value corresponding to the selected value in the drop down. |
| RadioButtons | A single codelist value corresponding to the selected value in the drop down. |
| Joint Count | A set of codes for selected/marked-up joints. |
| Body Image Map | A set of coordinates and one or more intensity values. |
| Initials | A string of characters or a digital image. |
| Signature | A string of characters or a digital image. |

In addition to CDL+D, CDL+T, and CDL+L configuration files, embodiments of this disclosure also can permit generating and/or validating configuration files that define scoring logic for an interactive electronic document. Such files can be referred to as CDL+S configuration files. A CDL+S configuration file defines, based on the data model, new scores that can be determined by the application 114, via the runtime component 140, for example, automatically for an interactive electronic document. One or more scores that may be associated with the questionnaire data model can be determined based on response(s) (that is, prompt response data) received by the application 114 during traversal of a questionnaire, in response to prompt(s) in the interactive electronic document. This function of calculating the scores should be applied on the latest version of the dataset. That is, the application 114 should obtain a score based on data as have been determined at the time the score is used and/or probed.

In addition, or in some embodiments, configuration files that define data exports also can be generated and validated. Such files can be referred to as CDL+E configuration files. The CDL+E configuration file can permit configuring how data export files may be formatted, and how data may be arranged within a data export file. Information from this configuration artifact may be applied at time of executing data exports. A CDL+E configuration file can be embodied in a template for data mapping, data calculation, and/or data transformation between a questionnaire data model, for example, and an export file. The CDL+E configuration file can permit exporting responses collected during traversal of a questionnaire and arranging such responses in a particular structure. As such, the CDL+E configuration file can permit configuration of the position of each data model item in the export file together with any fixed values associated with the item; configuration of file separators; and/or configuration of file names.

Figure 9:
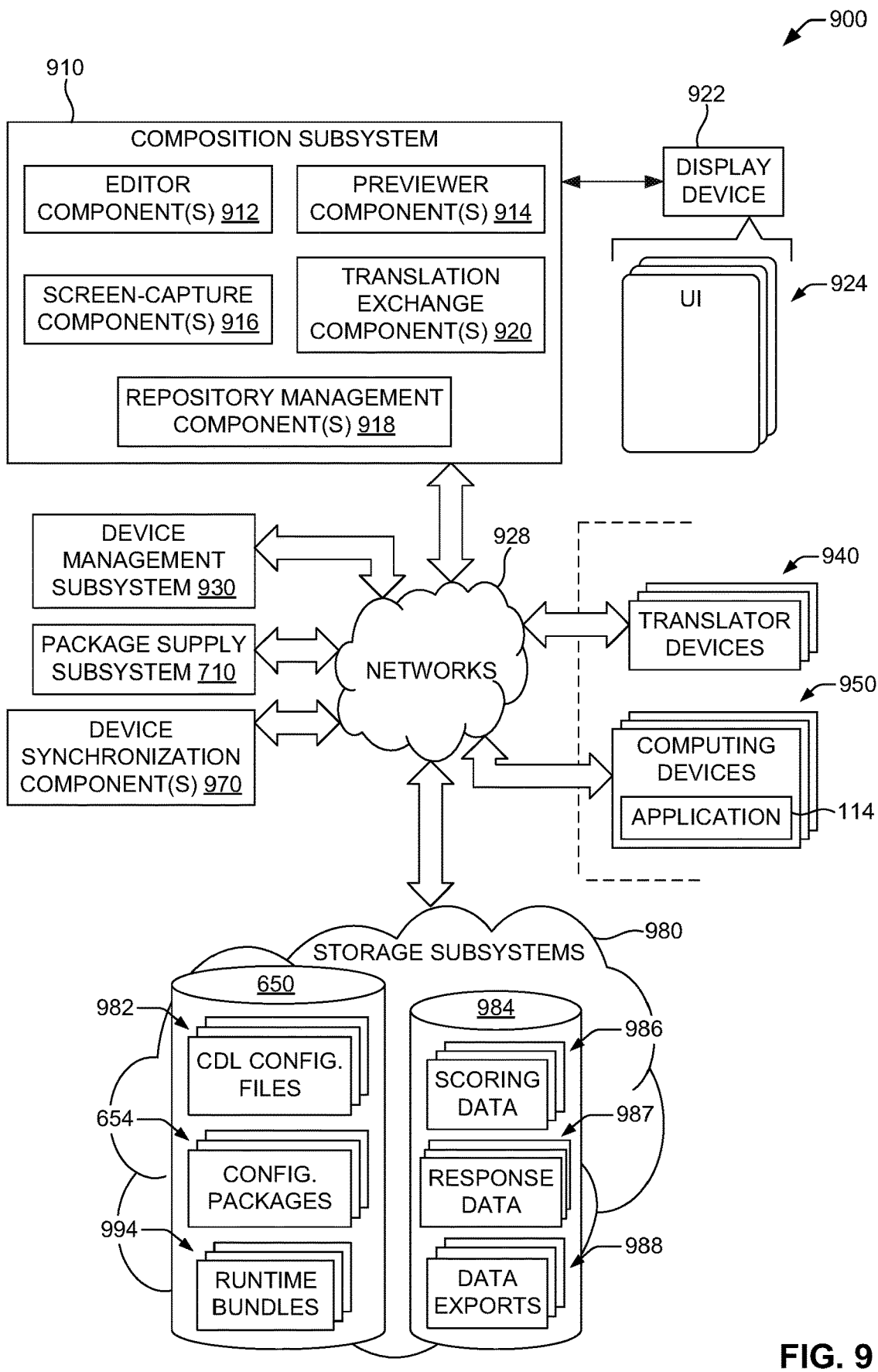
FIG. 9 illustrates an example of a computing system, in accordance with one or more embodiments of this disclosure.

As is illustrated in FIG. 9, embodiments of this disclosure can include a computing system 900 that permits generating interactive electronic documents (e.g., a questionnaire or a consent document) in accordance with aspects described herein. The computing system 900 can host various subsystems and components. The computing system 900 can be a distributed system. More specifically, the computing system 900 can include a composition subsystem 910 that includes various components.

Figure 10A:
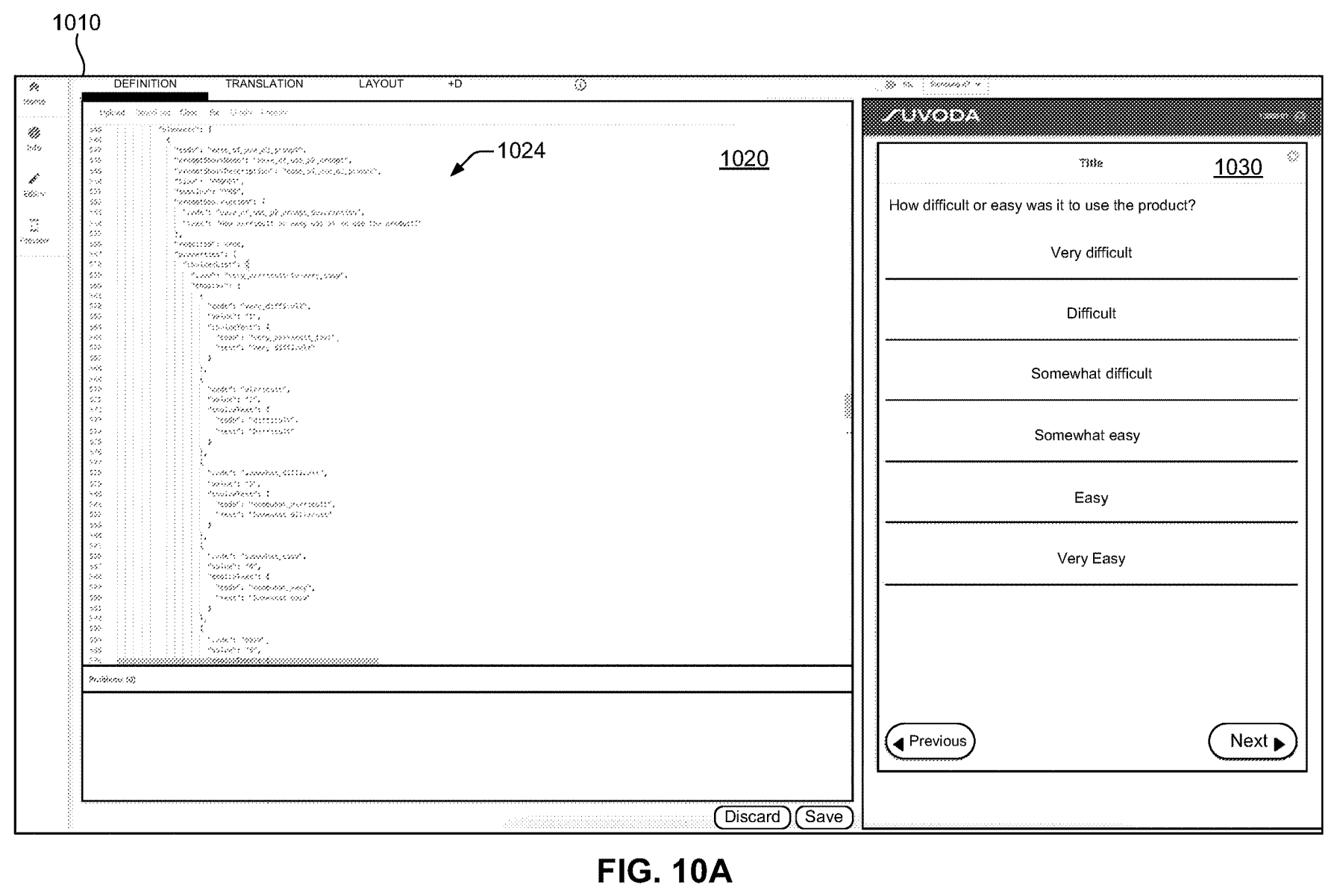

The composition subsystem 910 includes one or more CDL editor components 912. The CDL editor component(s) 912, individually or in a particular combination, can permit an end-user to directly and interactively edit CDL configuration files. The CDL editor component(s) 912 can thus permit any interactive customization of CDL configurations. To that end, the editor component(s), individually or in a particular combination, can cause a display device 922 to present user interfaces 924 (UIs 924), each including selectable visual elements configured to receive input data defining a CDL configuration file. Simply as an illustration, the example UI 1010 shown in FIG. 10A is an example of one of the UIs 924. The UI 1010 includes a view pane 1020 that is selectable and can receive input data defining a CDL+D configuration file. More specifically, the input data can define at least text 1024 that, in turn, can define a portion of the CDL+D configuration file. As it can be seen from FIG. 10A, the text 1024 is human-readable text. The text 1024 also is shown in FIG. 10B. The example UI 1010 also includes a second view pane 1030 that can present a view associated with the input data entered into the view pane 1020. The view can be presented in time coordinated fashion with the entry of the input data defining a CDL+D configuration file, in some cases. That is, the view pane 1020 can present the view in nearly real-time, as input data is entered into the view pane 1020. The view can thus be referred to as real-time preview. To present the real-time preview in the view pane 1020, at least one of the CDL editor component(s) 912 can pass or otherwise provide a current definition of the configuration file to a first previewer component of previewer component(s) 914. The first previewer component can cause the display device 922 to present, based on that current definition of the configuration file, a current view within the second view pane 1030.

Figure 10C:
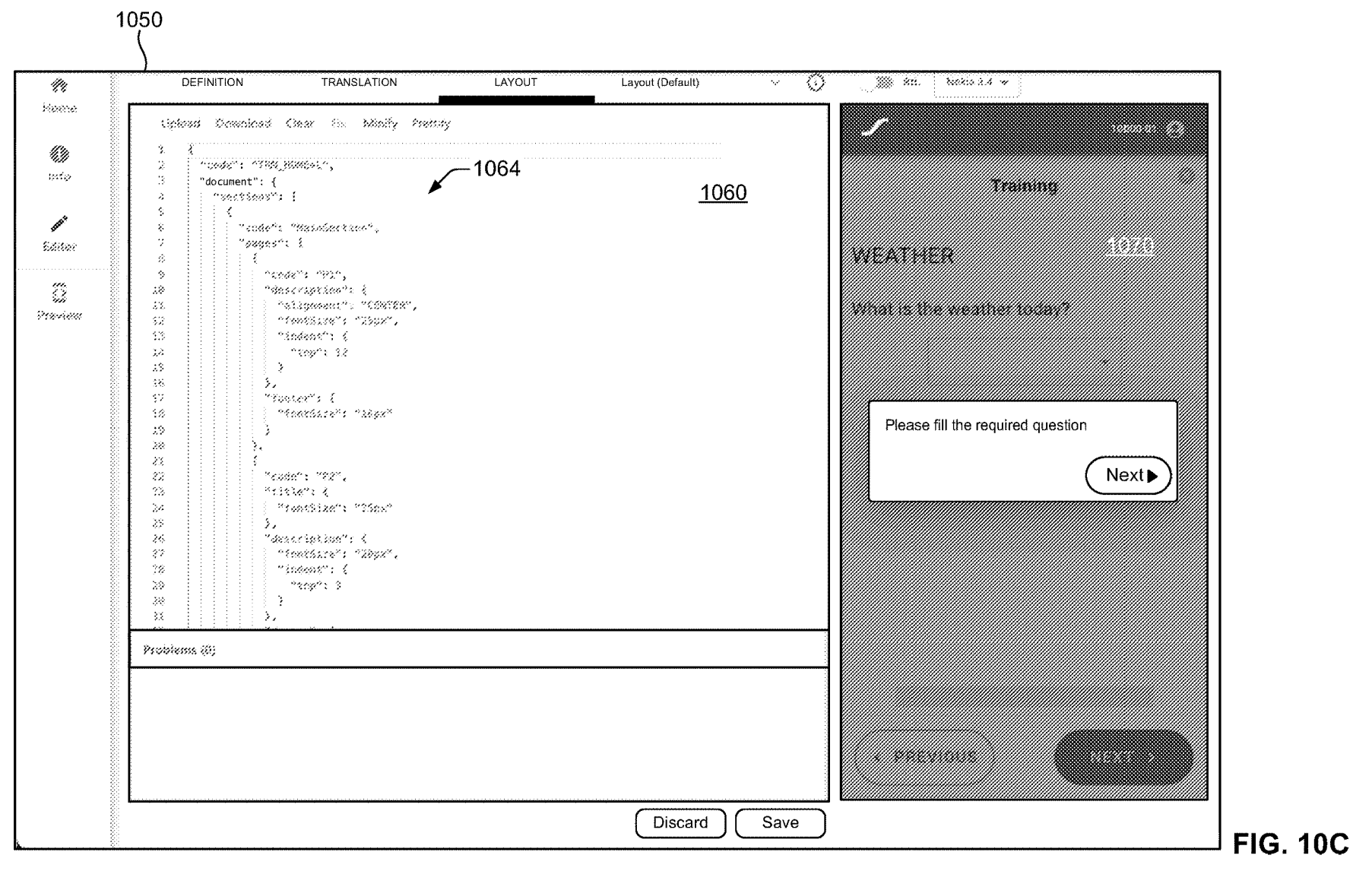

FIG. 10C illustrates an example UI 1050 having a first view pane 1060 and a second view pane 1070. Similar to the second view pane 1020 (FIG. 10A), the view pane 1060 is selectable and can receive input data defining a CDL+L configuration file. More specifically, the input data can define at least text 1064 that, in turn, can define a portion of the CDL+L configuration file. As it can be seen from FIG. 10C, the text 1064 is human-readable text. Simply as an illustration, the text 1064 also is shown in FIG. 10D. Similar to the view pane 1030 (FIG. 10A), the view pane 1070 can present a view associated with the input data entered into the view pane 1060. That view also can be presented in time coordinated fashion with the entry of the input data, in some cases. That is, the view pane 1070 can present the view in nearly real-time, as input data is entered into the view pane 1020. The first previewer component can cause the display device 922 to present, based on the current definition of the CDL+L configuration file, a current view within the second view pane 1070.

In some cases, a second previewer component is included in the previewer component(s) 914. After a CDL configuration file has been generated, using the CDL editor component(s) 912, for example, the second previewer component can permit obtaining (e.g., loading) the CDL configuration file. The second previewer component can then cause the display device 922 to present the outcome of that CDL configuration file and/or any errors in processing the CDL configuration file or a configuration package that includes that CDL configuration file. The second previewer component can permit navigating between the various questionnaire chapters and also presenting the layout for each of the chapters as it was applied by a runtime bundle, the placeholder text for all the elements in the screen, the number and type of answers collected from an end-user, and the like.

In addition, or in another aspect, the second previewer component can permit executing (or running) an interactive electronic document (e.g., a questionnaire) in order to verify that the data collected can obey a defined data model (a test the data model, for example). To that end, the second previewer component can receive one or more answers, from an end-user, for example, to each of the chapters viewed. The second previewer component can then cause the display device 922 to present how the data may be mapped (e.g., how the answer object may look for that question, for example).

The composition subsystem 910 also can include one or more screen-capture generation components 916. The screen-capture component(s) 916, individually or in combination, can provide various functionalities in connection with generating and, in some cases, presenting screen-capture images (also referred to as screenshots) for a given CDL configuration package. Screen-capture images can include everything that an end-user can observe during the traversal of a questionnaire or another type of interactive electronic document, including all possible views, including all possible validation messages and validation screens, translated to the natural language that a consumer/final end-user may use. The screen-capture component(s) 916, individually or in combination, can generate screen-capture images for any combination of device, natural language, and interactive electronic document. In some cases, the screen-capture images may be used for review of translation work product (created by a human expert or an autonomous machine). In other cases, the screen-capture images may be used in a submission for approval of a clinical trial involving a particular questionnaire.

The composition subsystem 910 also can include one or more translation exchange components 920. The translation exchange component(s) 920 can permit exchanging data pertaining to CDL+T configuration files with one or more translator devices 940. The translator devices 940 can be remotely located relative to the composition subsystem 910 (or, in some cases, computing device(s) that can host the composition subsystem 910). Such data can be exchanged in numerous ways. In some cases, the translation exchange component(s) 920, individually or in combination, can provide (e.g., host) an editing service and can send data pertaining to a CLD+T configuration file to one or more of the translator devices 940. The CDL+T configuration file corresponds to a specific natural language. The CDL+T configuration file can include human-readable text defining codes corresponding to respective prompts and including, for each prompt, text in English as a description of the prompt. The CDL+T configuration also can include placeholder string (e.g., an empty string), where the placeholder string serves as placeholder where text indicative of a translation to a desired natural language can be received. In addition, the translation exchange component(s) 920 can receive, via the editing service, input data defining at least parts of the CDL+T configuration file, where such input data is formatted according to CDL. In other cases, the translation exchange component(s) 920, can transform a CDL+T configuration to a particular format that can be used by at least one of the translator devices 940, and can then data in that particular format to the at least one device of the translator devices 940. For example, such data can be sent in a file compatible with the particular format. Additionally, the translation exchange component(s) 920 can receive (in a file, for example) other data formatted according to the particular format, and can then transform that other data to a CDL+T configuration file.

The translation exchange component(s) 920 can use the screen-capture component(s) 916 to obtain screen-capture images of an interactive electronic document according to a CDL+T configuration file defined by a translator device of the translator devices 940. The CDL+T configuration file corresponding to a specific natural language. The translation exchange component(s) 920 can then send the screen-capture images to the translator device. In response, the translator device can perform, or can facilitate, a review of the screen-capture images in order to assess quality of translations pertaining to the CDL+T configuration file in the specific natural language.

This disclosure is not limited to generation of CDL configuration files via the editor component(s) 912. Although not shown in FIG. 9, in some embodiments, the computing system 900 can include a designer subsystem that can permit generating interactive electronic documents graphically and/or according to preset forms. Such a subsystem can use in the repository management component(s) 918a to manage configurations and supply those configurations to a workflow service for further use by an application 954 (e.g., an in-clinic applications or at-home application).

Further, or in some cases, the computing system 900 also can include an administrator-screen presentation component (not depicted in FIG. 9). Such a component can connect the management of a questionnaire library and the usage of questionnaires in an eCOA trial executed on particular platform. In one aspect, an authenticated and authorized user may publish a questionnaire from the library of questionnaires directly to a specific questionnaire ID, from a specific study, where the user is authorized to perform such an action.

The composition subsystem 910 also includes one or more repository management components 918 that can permit perusing CDL configuration files 982 or configuration packages 654, or both, that are retained in the data repository 650. To that end, the repository management component 918 can cause the display device 922 to present a user interface that can include a listing of interactive configuration packages (or respective interactive electronic documents) or constituent configuration files retained in the data repository 650. Each item included in the listing can be represented by a selectable visual element that, in response to being selected, causes presentation of one or more of the configuration files (CDL+D, CDL+T, CDL+L) that constitute the selected item (or configuration package). That user interface can be one of the UIs 924. The UI 1110 shown in FIG. 11A is an example of such a user interface. The UI 1150 shown in FIG. 11B is an example of a user interface that can be presented in response to selecting an item in the listing of interactive configuration packages. As is described herein, the contents of the data repository 650 can be generated by the configuration component 714 that is part of the package supply subsystem 710 included in the computing system 900. It is noted that the display device 922 facilitates the authoring and management of interactive electronic documents, as opposed to the display device 120 (FIG. 1) that permits traversing, and thus completing, an interactive electronic document.

The repository management component(s) 918, individually or in combination, also can permit managing a library of interactive electronic documents (or respective configuration packages 654). Additionally, the repository management component(s) 918, individually or in combination, can permit an end-user to save configuration files (e.g., CDL+D, CDL+T, CDL+L) to the data repository 650, as part of CDL configuration files 982. The repository management component(s) 918, individually or in combination, also can permit managing the configuration files 982 and configuration packages 654, and storing additional arbitrary data about those configuration files and configuration packages.

The computing system 900 also includes one or more device synchronization components 970. At least one of the device synchronization component(s) 970 can be functionally coupled to computing devices 950, each including the application 114 (FIG. 1) described herein. As is represented by dashed lines, the computing devices 950 can be external to the computing device 900. At least one network of networks 928 can provide such a functional coupling. Because a computing device of the computing devices 950 may be a semi-connected device, e.g., a device that lacks connectivity to the at least one network during some periods of time, at least one of the device synchronization component(s) 970 can receive data from the computing device during periods of time when the computing device has connectivity to the at least one network. Such data can define a current state of traversal of the interactive documents at the computing device. Accordingly, the data can include prompt response data indicative of one or more responses to respective prompts that have been presented the computing device. In response to receiving such data, one or more of the device synchronization component(s) 970 can synchronize (i) the current state of traversal of the interactive electronic document at the computing device and (ii) the last-recorded state of traversal of the interactive electronic document. In addition to, or as part of synchronizing such states, the device synchronization component(s) 970 can retain the prompt response data as part of response data 987 within a data repository 984. The device synchronization component(s) 970 also can send other data to a computing device of the computing devices 950 in response to the computing device becoming connected to the at least one network of the networks 928. Such other data can include setting parameters that can control aspects of the implementation of an interactive electronic document at the computing device.

At least one of the device synchronization component(s) 970 can receive scoring data from one or more of the computing devices 950, and can retain the scoring data as part of scoring data 986 within the data repository 984. At least one of the device synchronization component(s) 970 also can receive exported data from interactive electronic documents, and can retain such exported data as part of data exports 988 within the data repository 984.

The computing system 900 further includes a device management subsystem 930 that can track the computing devices 950 used to traverse an interactive electronic document (such as a questionnaire or an consent document). To that end, the device management subsystem 930 can maintain records corresponding to respective ones of the computing device 950, each one of the records includes data indicative of computing resources of a computing device. The computing resources include operating system (O/S), visualization resources (e.g., display size, display resolution, type of UI toolkit, a combination thereof, or similar), and/or other resources. In some cases, the device management subsystem 930 can provision one or more of the computing devices 950. As part of the provisioning, the device management subsystem 930 can generate such records for the provisioned computing device(s). In addition, or in other cases, the device management subsystem 930 can generate such records for each computing device that obtains (e.g., downloads and installs) the application 114. As part of provisioning a computing device, the device management subsystem 930 also can generate a record including data indicating a relationship between the computing device and an organization that provides interactive electronic documents to end-users using the computing device. Such a relationship can indicate that the computing device that is supplied or otherwise managed by the organization or that the computing device is external to the organization. A computing device external to the organization can categorized as a bring-your-own-device (BYOD) type.

Figure 12A:
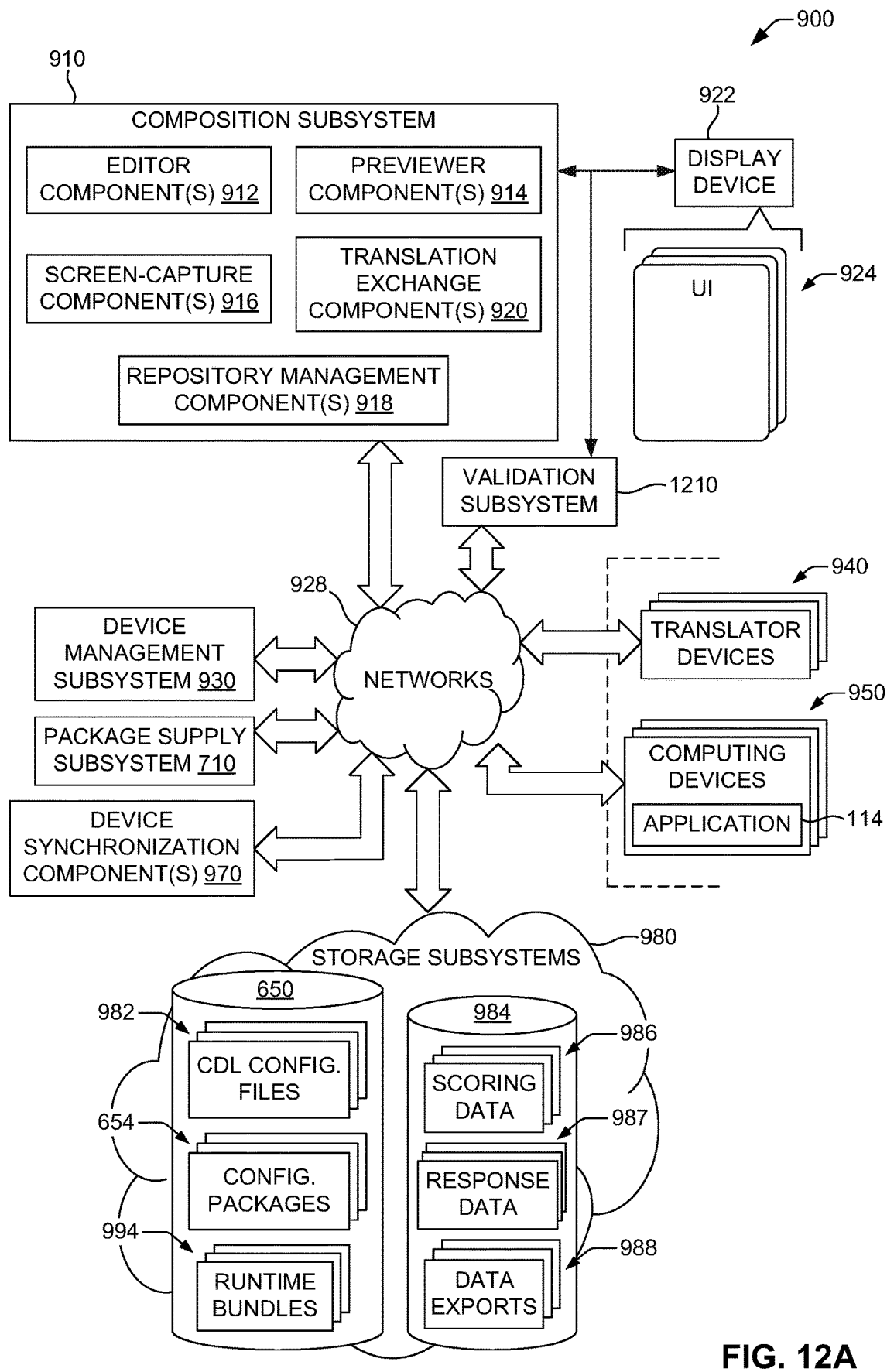
FIG. 12A illustrates an example of a computing system, in accordance with one or more embodiments of this disclosure.

In some embodiments, as is shown in FIG. 12A, the computing system 900 can include a validation subsystem 1210 functionally coupled to at least the composition subsystem 910. In some cases, the validation subsystem 1210 also can be functionally coupled to the display device 922. The validation subsystem 1210 can validate a configuration package for a series of views. Validating the configuration package can permit maintaining an accurate validation state of the configuration package. The configuration package can be one of the configuration packages 654.

In order to validate configuration files, the validation subsystem 1210 can first update validation status of the configuration files. To that end, the validation subsystem 1210 can include a first component 1250, shown in FIG. 12B, that can determine that a first configuration file has changed. The configuration file can be retained in the CDL configuration files 982, and can be one of a CDL+D configuration file, a CDL+T configuration file, or a CDL+L configuration file. The first component 1250 can then identify a configuration package that contains the first configuration file. As mentioned, the configuration package can be one of the configuration packages 654, for example.

Additionally, the first component 1250 can identify one or more second configuration files being dependent on the first configuration file. The second configuration file(s) are included in the configuration package. To determine such a dependency, the first component 1250 can determine a reference associating the first configuration file to another configuration file, and can then identify such other configuration file as one of the second configuration file(s). The first component 1250 can determine if a reference to yet another configuration file is present in that other configuration file. In the affirmative case, the first component 1250 identifies that additional other configuration file as another one of the second configuration file(s). The first component 1250 can continue analyzing references and associated configuration files until no other configuration files can be identified as one of the second configuration file(s).

The first component 1250 can categorize each file of the second configuration file(s) as a non-validated file. By categorizing each one of the second configuration file(s), the first component 1250 updates the validations status of each one of the second configuration file(s). Additionally, in contrast to existing technologies, by categorizing configuration file(s) and non-validated, the validation subsystem 1210 can isolate configuration file(s) for validation in response to a configuration file that has changed. Accordingly, computing resources can be more efficiently used when updating and/or maintaining interactive electronic documents in accordance with aspects of this disclosure.

The first component 1250 also can cause the display device 922 to present a UI including a listing of the second configuration file(s). The first component 1250 can then receive input data indicative of a selection of a non-validated file. Such input data can be received via selection of an element of the listing, where the element represents the non-validated file.

Figure 12B:
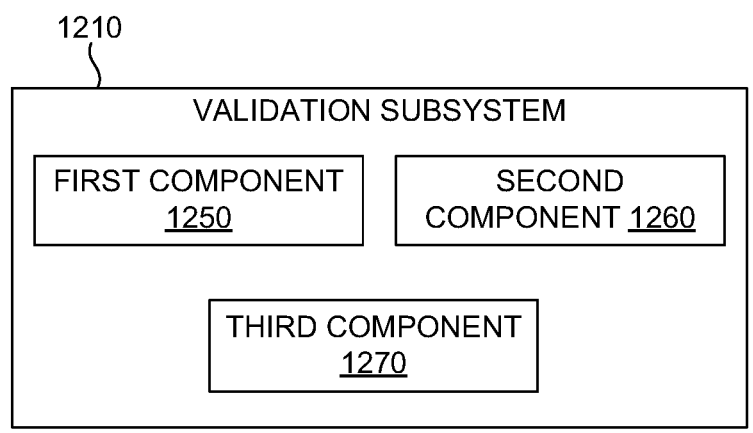
FIG. 12B illustrates an example of a validation subsystem, in accordance with one or more embodiments of this disclosure.

In some cases, a second component 1260, shown in FIG. 12B, of the validation subsystem 1210 can provide the non-validated file to the composition subsystem 910. The second component 1260 can provide the selected non-validated file in numerous ways. In one example, the second component 1260 can pass a reference to, or another type of identifier of, the selected non-validated file to the composition subsystem 910. The composition subsystem 910 can then obtain, using the reference or the other identifier, the non-validated file from the data repository 650.

The non-validated file can thus be updated via the composition subsystem 910, or one or more components thereof, in similar fashion to composition of a new configuration file. After an update to the non-validated file has been completed, the updated non-validated file can be made available to the validation subsystem 1210. The second component 1260 can obtain (e.g., receive or retrieve) the updated non-validated file, and can make the updated non-validated file available to a third component 1270, shown in FIG. 12B, of the validation subsystem 1210.

The third component 1270 can apply a validation test to the updated non-validated file. The validation test can be specific to the type of non-validated file. That is, the validation test that is applied to a CDL+D configuration file can be different from the validation test that is applied to a CDL+T configuration file. Similarly, the validation test that is applied to a CDL+D configuration file or a CDL+T configuration file can be different from the validation test that is applied to a CDL+L configuration file. For example, applying a validation test for a CDL+D configuration file can include executing (or causing to execute) one or more NO-CODE scripts and/or one or more LOW-CODE scripts, each of the scripts emulating end-user responses to the prompt(s) defined in the CDL+D configuration files. In response to executing (or causing to execute) one such script (NO-CODE script or LOW-CODE script), the third component 1270 can automatically determine if logic statements or expressions, or both, are properly implemented.

As another example, applying a validation test for a CDL+T configuration file can include, in some embodiments, applying a machine-learned model (such as generative adversarial neural networks (GANNs)) to determine validity or invalidity of a configuration file. More specifically, the third component 1270 can implement a GANN to translate text from a first natural language to a second natural language, where the text corresponds to a natural language statement in the first natural language. Additionally, the third component 1270, via the GANN, can then determine if it can detect any idiomatic errors or flaws in the translation of the text by reverse translating the prior translated text from the second natural language to the first natural language and comparing such a reverse translation to the original natural language statement in the first natural language. It is noted that in some cases, when the third component 1270 applies such a validation test, the validation test can use a customized set of one or more dictionaries. In one example, the dictionaries can be specifically applicable to a domain of a clinical trial language. The customized dictionaries can be retained in a data repository within the storage subsystems 980.

As yet another example, applying a validation test for a CDL+L configuration file can include, in some cases, applying a group of one or more geometrical conditions that define satisfactory visualization output for the CDL+L configuration file. Because a rendering engine (such as the presentation component 160) can draw UI elements in a UI at a display device, the rendering engine can access data indicative of the arrangement of the UI elements within the UI. As part of applying the validation test, the third component 1270 can determine if the rendered (or drawn) UI elements satisfy the one or more geometrical conditions. It is noted that during the application of the validation test, the UI can be rendered at the display device 922, by means of that rendering engine. A computing device that hosts the composition subsystem 910 can include the rendering engine.

Regardless of type of configuration file and validation test, successful application of the validation test (or, in some cases, multiple validation tests) to a configuration file (e.g., CDL+D, CDL+T, or CDL+L) results in the configuration file being validated. A state variable can be indicative of validation state of the configuration file.

After a validation test has been applied, the validation subsystem 1210 (via the first component 1250, for example) can determine if the updated non-validated file has been validated. A negative determination can results in another update of the updated non-validated file and subsequent additional application of validation test(s). A positive determination can result in the validation subsystem 1210 (via the first component 1250, for example) categorizing the updated non-validated file as a validated configuration file. The validation subsystem 1210 (via the second component 1260, for example) can add the validated configuration to the configuration package that initially contained a non-validated version of the validated configuration file.

Figure 13:
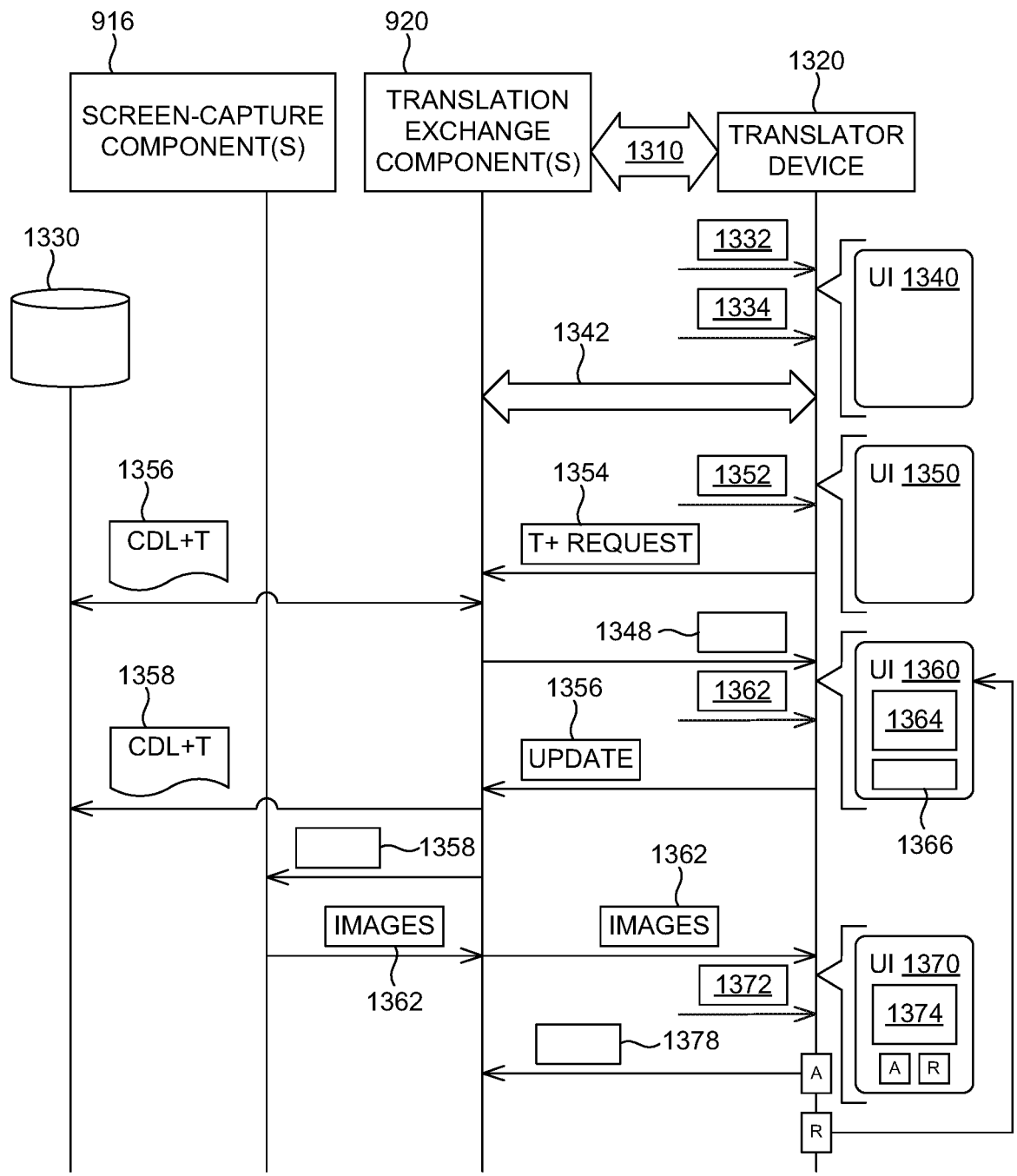
FIG. 13 illustrates an example of a process flow for the exchange of translation information, in accordance with one or more embodiments of this disclosure.

FIG. 13 illustrates an example of a process flow for the exchange of translation information, in accordance with one or more embodiments of this disclosure. A translator device 1320 can receive input data 1332 to access a login page of an editing service provided by the translation exchange component(s) 920. The editing service permits configuring or otherwise updating CDL+T configuration files. In response to receiving the input data 1332, the translator device 1320 can present a UI 1340 that presents the login page. The translator device 1320 can then receive input data 1334 defining login credentials. As part of a login process 1342, the translator device 1320 can send the login credentials to the translation exchange component(s) 920, and in response, can be authenticated and authorized to access the editing service.

In response to accessing the editing service, the translator device 1320 can present a UI 1350 that includes UI elements identifying CDL+T configuration file(s) to be updated with translations for a particular natural language. The translator device can receive input data 1352 indicative of selection of a particular CDL+T configuration file 1356. The translator device can send a request for 1354 for the particular CDL+T configuration file to the translation exchange component(s) 920. In response to the request, the translation exchange component(s) 920, individually or in combination, can obtain the CDL+T configuration file 1356 from a data repository 1330 and can cause the translator device 1320 to present a UI 1360. As part of causing the translator device 1320 to present the UI 1360, the translation exchange component(s) 920 can send translation data 1358 to the translator device 1320. The translation data 1348 can define human-readable text that includes, for example, text in English and also can include placeholder text in a desired natural language, where the placeholder text serves as placeholder for text in the desired natural language. For instance, the desired language can be Portuguese, and the humanreadable-language that is defined by the translation data 1348 and form part of the CDL+T configuration file includes the following: {"Code": "Q12", "Text": "How bad is your pain?", "Translation": "Quão ruin) é a sua dor?"}, {"Code" . . . .

The UI 1360 can include a review pane 1364 where human-readable text defined by the translation data received from the translation exchange component(s) 920 can be viewed and edited. Editing such human-readable text can include, for example, editing placeholder text in the desired natural language. To edit the human-readable text defined by the translation data, the translator device 1320 can receive input data 1362 defining statements in a desired natural language. After translations a deemed satisfactory, the translator device 1320 can receive first data within the input data 1362 indicative of acceptance of the edited translation data. The first input data can be received via selection of a selectable visual element 1366 present in the UI 1360. In response, the translator device 1320 can send update data 1356 to the translation exchange component(s) 920. The update data 1356 can include at least a portion of the edited translation data. In response to receiving the update data 1356, the translation exchange component(s) 920, individually or in combination, can generate a CDL+T configuration file 1358 within the data repository 1330. The CDL+T configuration file 1358 corresponds to an updated version of the particular CDL+T translation file 1356.

In response to generating the CDL+T configuration file 1358, the translation exchange component(s) 920 can send a directive 1358 (or, in some cases, a request) that causes the screen-capture component(s) 916 to generate one or multiple screen-capture images 1362. The translation exchange component(s) 920 can receive the screen-capture image(s) 1362 and can send the screen-capture image(s) 1362 to the translator device 1320. The screen-capture image(s) 1362 can be sent individually or contained in a single file. Receiving the screen-capture image(s) 1362 can cause the translator device 1320 to present a UI 1370. The UI 1370 includes a review pane 1374 and control elements, including a first control element (labeled with "A") and a second control element labeled "R"). Selection of the first control element, via input data 1372, can cause the translator device 1320 to send an indication 1378 to accept the translations contained in the screen-capture image(s) 1362. Selection of the second control element is indicative of rejection of the translations contained in the screen-capture images 1362, and causes the translator device 1360 to present the UI 1360 for further edits to the translation data 1348.

Figure 14:
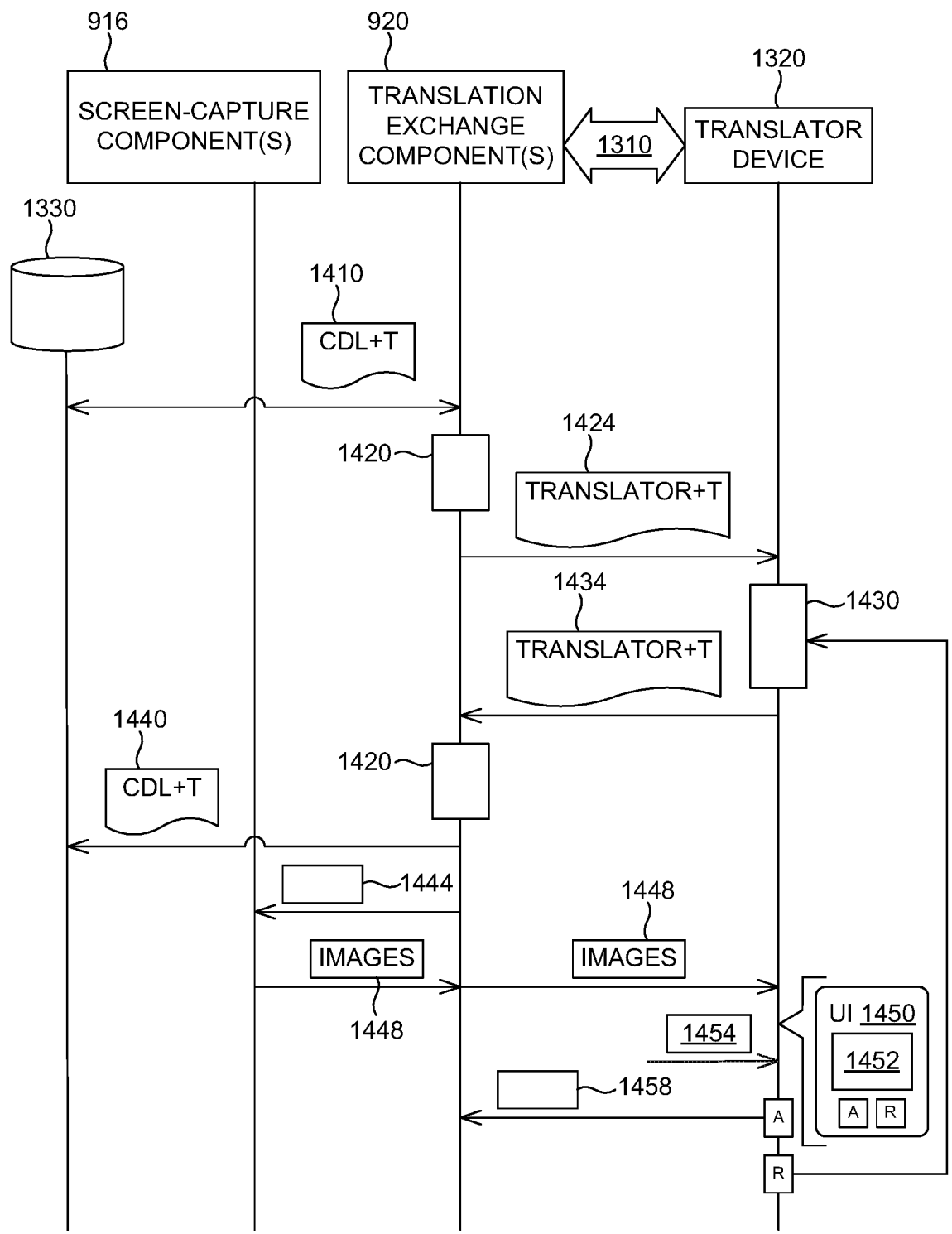
FIG. 14 illustrates another example of a process flow for the exchange of translation information, in accordance with one or more embodiments of this disclosure.

FIG. 14 illustrates another example of a process flow for the exchange of translation information, in accordance with one or more embodiments of this disclosure. The translation exchange component(s) 920 can obtain, from the data repository 1330, a CDL+T configuration file 1410 for a particular natural language. The translation exchange component(s) 920, individually or in combination, can implement a transformation process 1420 that can transform the CDL+T configuration file 1410 to a translator+T file 1424. The translator+T file 1424 contains the translation data present within the CDL+T configuration file, but the translation data is formatted according to a particular format that can be operated upon by the translator device 1320. The translation exchange component(s) 920 can send the translator+T file 1424 to the translator device 1320.

The translator device 1320 can receive the translator+T file 1424 and, in response, can operate on the translator+T filed 1424 by implementing an editing process 1430. The implementation of the editing process 1430 can result in a translator+T file 1434 that contain updated translation data corresponding to the CDL+T configuration file 1410, in the particular natural language. The translator device 1320 can send the translator+T file 1434 to the translation exchange component(s) 920. In response to receiving the translator+T file 1434, the translation exchange component(s) 920, individually or in combination, can implement the transformation process 1420 to transform the translator+T file 1434 to a CDL+T configuration file 1440 in the particular natural language. The translation exchange component(s) 920 can retain the CDL+T configuration file 1440 within the data repository 1330. In some cases, the translation exchange component(s) 920, individually or in combination, can generate a CDL+L configuration file (not depicted in FIG. 14) for a particular computing device and UI toolkit. In other cases, the translation exchange component(s) 920, individually or in combination, can cause the package supply subsystem 710 to generate such a CDL+L configuration file.

In response to generating the CDL+T configuration file 1440, the translation exchange component(s) 920 can send a directive 1444 (or, in some cases, a request) that causes the screen-capture component(s) 916 to generate one or multiple screen-capture images 1448. The translation exchange component(s) 920 can receive the screen-capture image(s) 1448 and can send the screen-capture image(s) 1448 to the translator device 1320. The screen-capture image(s) 1448 can be sent individually or contained in a single file. Receiving the screen-capture image(s) 1448 can cause the translator device 1320 to present a UI 1450. The UI 1450 includes a review pane 1452 and control elements, including a first control element (labeled with "A") and a second control element labeled "R"). Selection of the first control element, via input data 1454, can cause the translator device 1320 to send an indication 1458 to accept the translations contained in the screen-capture image(s) 1448. Selection of the second control element is indicative of rejection of the translations contained in the screen-capture image(s) 1448, and causes the translator device 1320 to again implement the editing process 1430 for edits to the translation data contained in the translator+T file 1434.

It is noted that both process flows shown in FIG. 13 and FIG. 14 rely on the separation of translation aspects from other aspects of configuration of an interactive electronic document. Further, by implementing either one of the process flow shown in FIG. 13 or the process flow shown in FIG. 14, embodiments of this disclosure provide an efficient mechanism to exchange configuration files with a translator platform. Compared to existing technologies, this mechanisms largely mitigates human intervention and efficiently uses computing resources when translations of an interactive electronic document are implemented.

Figure 15:
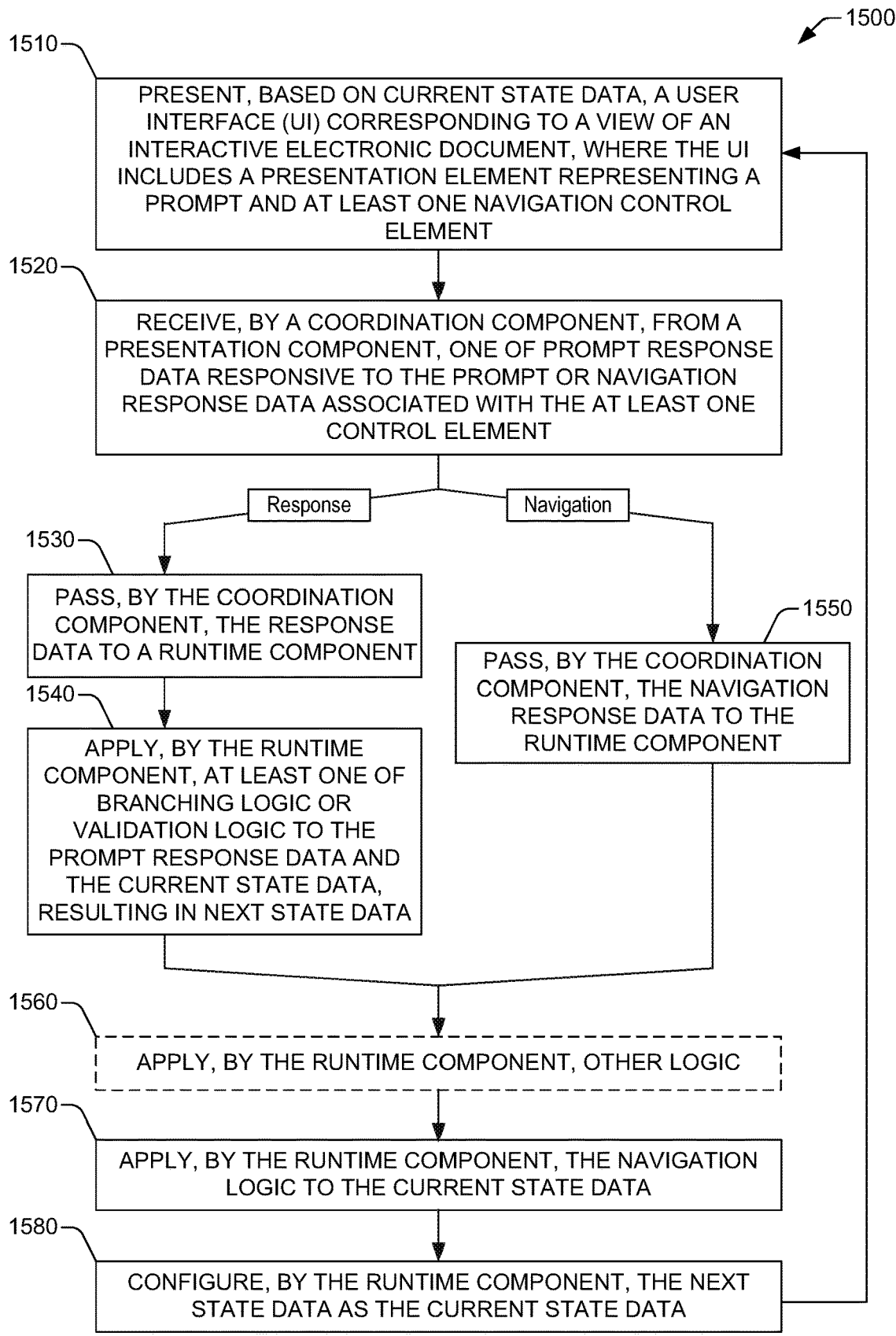
FIG. 15 illustrates an example of a method, in accordance with one or more embodiments of this disclosure.
Figure 16:
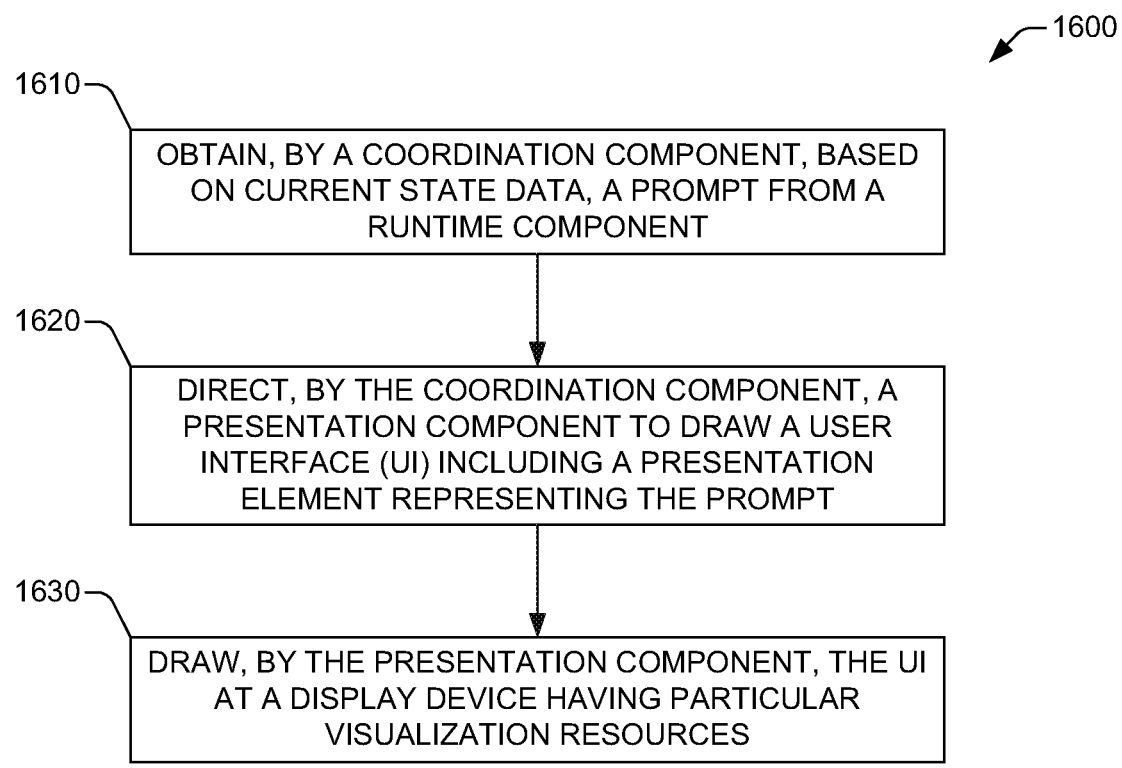
FIG. 16 illustrates an example of a method, in accordance with one or more embodiments of this disclosure.
Figure 17:
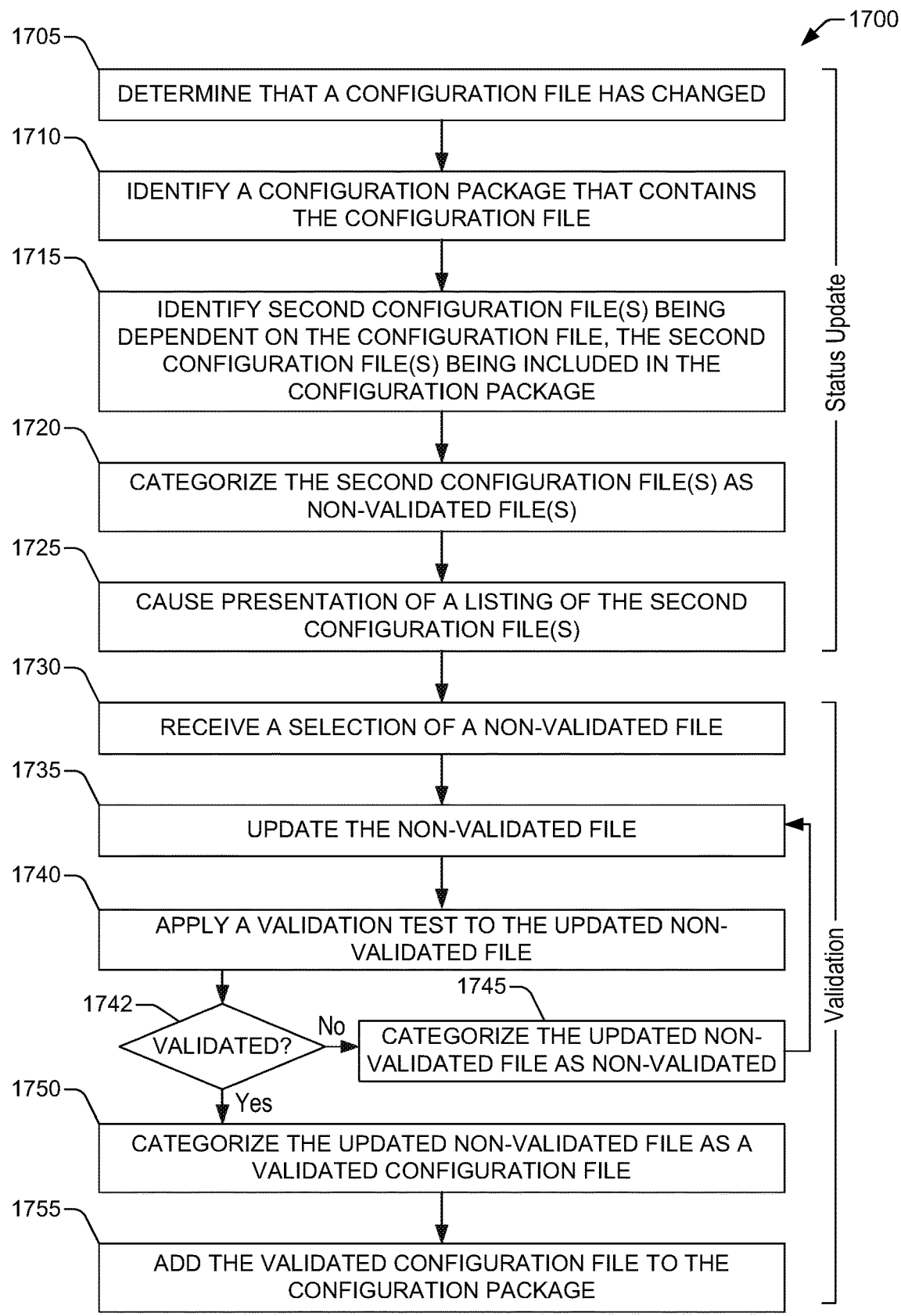
FIG. 17 illustrates an example of a method, in accordance with one or more embodiments of this disclosure.

In view of the aspects described herein, example methods that may be implemented in accordance with this disclosure can be better appreciated with reference, for example, to the flowcharts in FIGS. 15-17. For the sake of simplicity of explanation, the example methods disclosed herein are presented and described as a series of blocks (with each block representing an action or an operation in a method, for example). However, the example methods are not limited by the order of blocks and associated actions or operations, as some blocks may occur in different orders and/or concurrently with other blocks from those that are shown and described herein. Further, not all illustrated blocks, and associated action(s), may be required to implement an example method in accordance with one or more aspects of the disclosure. Two or more of the example methods (and any other methods disclosed herein) may be implemented in combination with each other. It is noted that the example methods (and any other methods disclosed herein) may be alternatively represented as a series of interrelated states or events, such as in a state diagram.

The methods in accordance with this disclosure can be retained on an article of manufacture, or computer-readable non-transitory storage medium, to permit or facilitate transporting and transferring such methods to a computing device or system of computing devices (such as a mobile smartphone; a table computer; a blade server; and the like) for execution, and thus implementation, by one or more processors of the computing device(s) or for storage in one or more memory devices thereof or functionally coupled thereto. In one aspect, one or more processors, such as processor(s) that implement (e.g., execute) one or more of the disclosed methods, can be employed to execute program code (e.g., processor-executable instructions) retained in a memory device, or any computer- or machine-readable medium, to implement one or more of the disclosed methods. Such program code can provide a computer-executable or machine-executable framework to implement the methods described herein.

FIG. 15 illustrates an example method 1500 for traversing an interactive electronic document, in accordance with one or more embodiments of this disclosure. A computing device can implement the example method 1500 in its entirety or in part. To that end, the computing device includes computing resources that may implement at least one of the blocks included in the example method 1500. The computing resources comprise, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. In one example, the computing device can include programming interface(s); an operating system; software for configuration and/or control of a virtualized environment; firmware; and similar resources.

The computing device can embody the computing device 110 (FIG. 1) and can thus host the application 114 (FIG. 1) and components therein. The computing device can implement the example method 1500 at runtime of the application 114, in response to executing at least one of the runtime component 140, the coordination component 150, or the presentation component 160.

At block 1510, the computing device can present, during execution of the application 114 to traverse a series of views of the interactive electronic document a user interface (UI) corresponding to a view of the series of views. The UI can be presented based on based on current state data. The current state data includes various types of information; namely, first data defining current location and position within the interactive electronic document, second data indicative of a set of extant responses, third data indicative of validation errors; and other miscellaneous states. The UI can be presented at a display device (e.g., display device 120) that is integrated into the computing device or functionally coupled thereto. The UI includes a presentation element representing a prompt and at least one navigation control element. In one example, the series of views form a questionnaire, and the prompt corresponds to a question in the questionnaire.

At block 1520, the computing device can continue executing the application 114, and in response, the coordination component 150 can receive, from the presentation component 160, prompt response data responsive to the prompt or navigation response data associated with the at least one control element. The prompt response data can be formatted according to JSON, and can be received in that format. The navigation response data also can be formatted according to JSON, and can be received in that format. As is described herein, the coordination component 150 can be configured to cause presentation of pages/views of the interactive electronic document. Additionally, the presentation component 150 can be configured to draw respective UIs corresponding to the pages/views at a display device. In one example, the respective UIs can include the UIs 130, and the display device can be the display device 130. Accordingly, the example method 1500 can proceed in two different pathways: a response pathway and a navigation pathway. In FIG. 15, the response pathway is denoted by "Response" and the navigation pathway is denoted by "Navigation."

Proceeding in the response pathway, at block 1530, the computing device can continue executing the application 114, and in response, the coordination component 150 can send (or pass) the prompt response data to the runtime component 140. As is described herein, the runtime component 140 can be configured to apply navigation logic to the current state data, and also can be configured to apply branching logic and validation logic (which may be collectively referred to as traversal logic) to prompt response data. The navigation logic corresponds to a navigation mode for the interactive electronic document. For example, the navigation mode can be one of a linear mode, a hub-and-spoke mode, or a CAT mode.

Also in the response pathway, in response to further executing the application 114, at block 1540, the runtime component 140 can apply at least one of the branching logic or validation logic to the prompt response data and the current state data. As a result, the runtime component 140 can generate next state data. The branching logic and the validation logic can be formatted according to a CDL. Although not shown, as part of the example method 1500, the computing device also can obtain, via the runtime component 140, the branching logic and the validation logic. Obtaining, by the runtime component 140, the branching logic and the validation logic can include receiving first human-readable content defining the branching logic and second human-readable content defining the validation logic. The first human-readable content and the second human-readable content are formatted according to the CDL. In some embodiments, as is described herein, the runtime component 140 includes an interpreter component, and as part of the example method 1500, the runtime component 140 can apply the branching logic or the validation logic by applying, via the interpreter component, the branching logic or the validation logic directly in the CDL.

Proceeding in the navigation pathway, at block 1550, the computing device can continue executing the application 114, and in response, the coordination component 150 can send (or pass) the navigation response data to the runtime component 140.

Regardless of whether the example method 1500 proceeded in the response pathway or the navigation pathway, at block 1560, the computing device, via the runtime component 140, can optionally apply one or more other types of logic. Those other types of logic can include one or more of disabling logic, scoring logic, or exporting logic, for example.

At block 1570, the computing device can continue executing the application 114, and in response, the runtime component 140 can apply the navigation logic to the current state data. As part of the example method 1500, the computing device can obtain, via the runtime component, the navigation logic by receiving a group of rules corresponding to a navigation mode that defines a manner of traversal of the series of views. The group of rules can be received in a native format for a rule library included in the runtime component.

As is described herein, the runtime component 140 is not limited to rulesets and, thus, neither is the example method 1500. Indeed, in some embodiments, also as part of the example method 1500, the computing device can obtain, via the runtime component 140, the navigation logic by selecting a navigation mode component defining a navigation mode corresponding to the navigation mode that defines the manner of traversal of the series of views. In such embodiments, the runtime component 140 can use the interpreter component that may be included in the runtime component 140 to apply the navigation logic to the current state data by at least executing, via the interpreter component, the navigation mode component.

At block 1580, the computing device can continue executing the application 114, and in response, the runtime component 140 can configure the next state data as the current state data. Flow of the example method can then continue to block 1510, where the computing device can present, in response to the applying the navigation logic, based on the next state data, a second UI corresponding to a second view of the series of views. The second UI can include a presentation element representing a second prompt and at least one second navigation control element.

FIG. 16 illustrates an example method 1600 for presenting a page/view of an interactive electronic document, in accordance with one or more embodiments of this disclosure. A computing device can implement the example method 1600 in its entirety or in part. In some cases, the computing device that implements the example method 1500 also can implement the example method 1600. As mentioned, the example method 1600 can be implemented as part of implementing block 1510 of example method 1500.

The computing device that implements the example method 1600 can embody the computing device 110 (FIG. 1) and can thus host the application 114 (FIG. 1) and components therein. The computing device can implement the example method 1600 at runtime of the application 114, in response to executing at least one of the runtime component 140, the coordination component 150, or the presentation component 160.

At block 1610, the computing device can execute (or can continue executing) the application 114, and in response, the coordination component 150 can obtain (e.g., receive), from the runtime component 140, data defining a prompt. As mentioned, the prompt can include a question or a call to action.

At block 1620, the computing device can continue executing the application 114, and in response, the coordination component can direct the presentation component 160 to draw a UI including a presentation element representing the prompt. In some cases, the UI includes multiple presentation elements corresponding to respective prompts.

At block 1630, the computing device can continue executing the application 114, and in response, the presentation component 160 can draw the UI at a display device according to a desired or otherwise defined set of visualization resources. As mentioned, the UI can be one of the multiple UIs 130, such as UI 132, and the display device can be the display device 130 (FIG. 1).

Although not shown in FIG. 16, the example method 1600 also can include receiving, by the coordination component 150, data defining layout logic configured for a combination of the interactive electronic document, a particular natural language, and particular visualization resources. Such data can be formatted according to a core definition language. As such, in some embodiments, directing the presentation component 160 to draw the UI can include passing the data defining the layout logic to the presentation component for interpretation by a library of UI elements (e.g., UI element library 166 (FIG. 1)). The library of UI elements can include at least one presentation element and at least one control element. Drawing, by the presentation component 160, the UI at the display device can then include obtaining, at runtime, a UI element from the library of UI elements, and supplying one or more UI elements for inclusion in a defined layout of areas within the UI. Such a UI element can be configured according to one or more visualization resources of the display device, the one or more visualization resources being defined by the layout logic and comprising a graphics resolution and size of visualization area.

FIG. 17 illustrates an example method 1700 for validating a configuration package for a series of views, in accordance with one or more embodiments of this disclosure. Validating the configuration package can permit maintaining an accurate validation state of the configuration package. A computing device can implement the example method 1700 in its entirety or in part. To that end, the computing device includes computing resources that may implement at least one of the blocks included in the example method 1700. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the computing device can include programming interface(s); an operating system; software for configuration and/or control of a virtualized environment; firmware; and similar resources.

The computing device that implements the example method 1700 can host the validation subsystem 1210 (FIG. 12A) and components therein. The computing device can implement the example method 1700 in response to executing, for example, one or more of the first component 1250, the second component 1260, or the third component 1270.

At block 1705, the computing device can determine (via, for example, the first component 1250) that a first configuration file has changed. The configuration file can be one of a CDL+D configuration file, a CDL+T configuration file, or a CDL+L configuration file.

At block 1710, the computing device can identify (via the first component 1250, for example) a configuration package that contains the configuration file. The configuration package can be one of the configuration packages 654 (FIG. 6B) for example.

At block 1715, the computing device can identify (via the first component 1250, for example) one or more second configuration files being dependent on the first configuration file. The second configuration file(s) are included in the configuration package.

At block 1720, the computing device can categorize (via the first component 1250, for example) each file of the second configuration file(s) as a non-validated file.

At block 1725, the computing device can cause (via the first component 1250, for example) presentation of a listing of the second configuration file(s). The listing can be presented in a display device that is integrated into the computing device or functionally coupled thereto.

Collectively, blocks 1705 to 1725 can form a method for updating validation status of configuration files.

At block 1730, the computing device can receive (via the first component 1250, for example) input data indicative of a selection of a non-validated file.

At block 1735, the computing device can update or can cause an update of the non-validated file. The computing device can cause the update of the non-validated file via the second component 1260, for example. The computing device can cause the composition subsystem 910 (FIG. 9) to update of the non-validated file. In some embodiments, the computing device also can host the composition subsystem 910 and components therein. Accordingly, the computing device can update the non-validated file via that subsystem.

At block 1740, the computing device can apply (via the third component 1270, for example) a validation test to the non-validated file. The validation test can be specific to the type of non-validated file. That is, the validation test that is applied to a CDL+D configuration file can be different from the validation test that is applied to a CDL+T configuration file. Similarly, the validation test that is applied to a CDL+D configuration file or a CDL+T configuration file can be different from the validation test that is applied to a CDL+L configuration file. For example, applying a validation test for a CDL+D configuration file can include executing one or more no-code scripts and/or one or more low-code scripts, each of the scripts emulating end-user responses to the prompt(s) defined in the CDL+D configuration files. In response to executing one such script (no-code script or low-code script), the computing device can automatically determine if logic statement or expressions, or both, are properly implemented.

As another example, applying a validation test for a CDL+T configuration file can include, in some embodiments, applying a machine-learned model (such as GANNs) to determine validity or invalidity of a configuration file. More specifically, the computing device can implement a GANN to translate text from a first natural language to a second natural language, where the text corresponds to a natural language statement in the first natural language. Additionally, the GANN can then determine if it can detect any idiomatic errors or flaws in the translation of the text by reverse translating the prior translated text from the second natural language to the first natural language and comparing such a reverse translation to the original natural language statement in the first natural language. It is noted that in some cases, when the computing device applies such a validation test, the validation test can use a customized set of one or more dictionaries. As mentioned, in one example, the dictionaries can be specifically applicable to a domain of a clinical trial language.

As yet another example, applying a validation test for a CDL+L configuration file can include, in some cases, applying a group of one or more geometrical conditions that define satisfactory visualization output for the CDL+L configuration file. Because a rendering component (such as the presentation component 160) can draw UI elements in a UI at a display device, the rendering component can access data indicative of the arrangement of the UI elements within the UI. As part of applying the validation test, the computing device can determine if the rendered (or drawn) UI elements satisfy the one or more geometrical conditions.

Regardless of type of configuration file and validation test, successful application of the validation test (or, in some cases, multiple validation tests) to a configuration file (e.g., CDL+D, CDL+T, or CDL+L) results in the configuration file being validated. A state variable can be indicative of validation state of the configuration file.

At block 1742, the computing device (via the first component 1250, for example) can determine if the updated non-validated file has been validated. A negative determination ("No" branch) results in the flow of the example method 1700 being directed to block 1745, where the computing device can categorize the updated non-validated file as non-validated before the flow of the example method 1700 continues to block 1735 for a further update. A positive determination ("Yes" branch) results in the flow of the example method 1700 being directed to block 1750, where the computing device can categorize the updated non-validated file as a validated configuration file.

At block 1755, the computing device (via the second component 1260, for example) can add the validated configuration to the configuration package.

Figure 18:
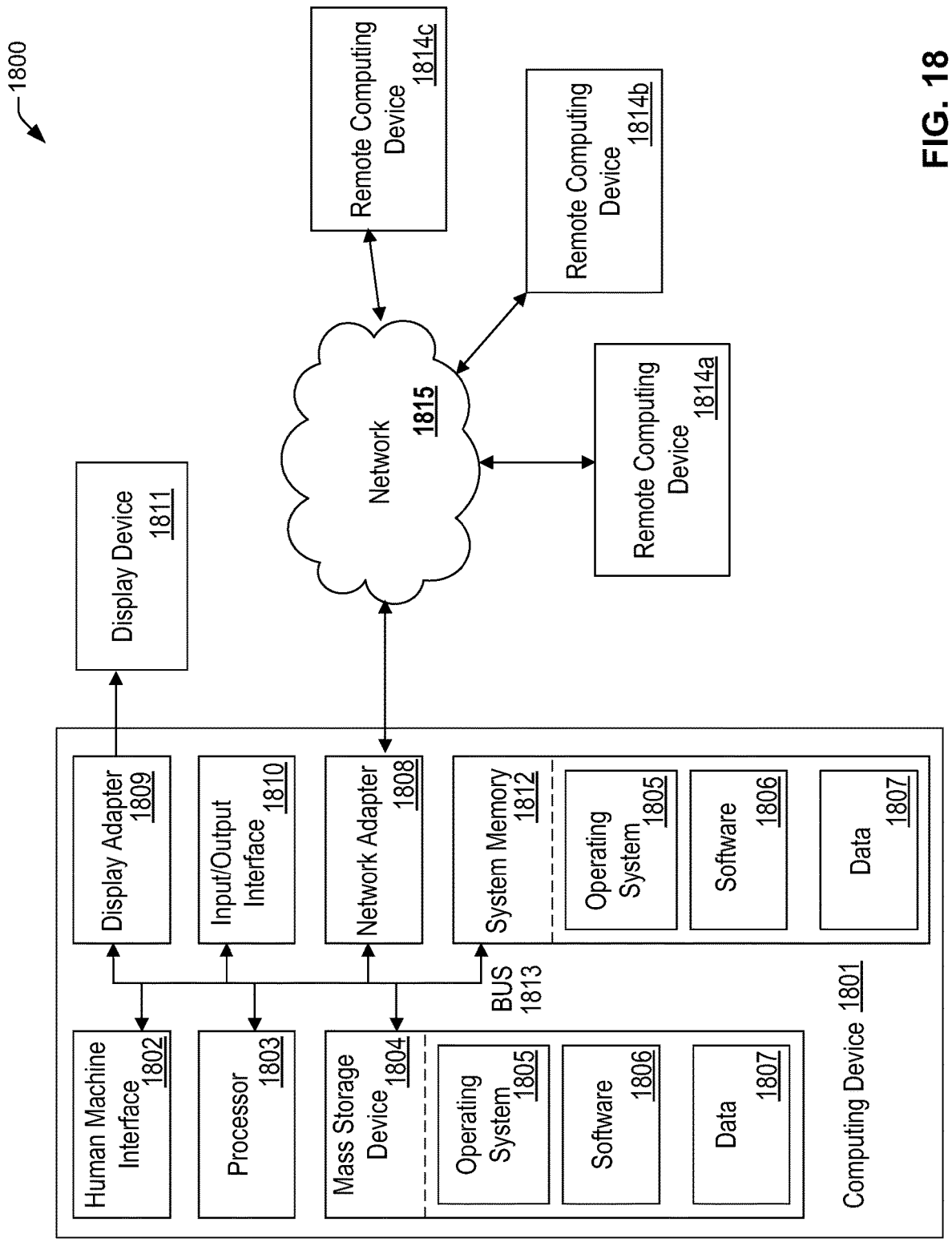
FIG. 18 illustrates an example of a computing system in accordance with one or more embodiments of this disclosure.

In order to provide additional context, the computer-implemented methods and systems of this disclosure can be implemented on the computing system 1800 illustrated in FIG. 18 and described below. Similarly, the computer-implemented methods and systems disclosed herein can utilize one or more computing devices to perform one or more functions in one or more locations. FIG. 18 is a block diagram illustrating an example of a computing system 1800 for performing the disclosed methods and/or implementing the disclosed systems. The computing system 1800 shown in FIG. 18 is only an example of a computing system and is not intended to suggest any limitation as to the scope of use or functionality of operating environment architecture. Neither should the operating environment be interpreted as having any dependency or requirement relating to any one or combination of components illustrated in the exemplary operating environment.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The disclosed systems and computer-implemented methods can be described in the general context of computer-executable instructions being executed by one or more computers or other processing devices. Generally, program modules can comprise program code, routines, objects, components, data structures, etc. that perform particular tasks or implement particular abstract data types. The disclosed computer-implemented methods can also be practiced in grid-based and distributed computing systems where tasks are performed by remote computing devices that are linked through a communications network. In a distributed computing system, program modules can be located in both local and remote computer storage media including memory storage devices.

Further, the systems and computer-implemented methods disclosed herein can be implemented via a general-purpose computing device in the form of a computing device 1801.

In some embodiments, the computing device 1801 can embody the computing device 110 (FIG. 1). The components of the computing device 1801 can comprise one or more processors 1803, a system memory 1812, and a system bus 1813 that functionally couples various system components including the one or more processors 1803 to the system memory 1812. The system can utilize parallel computing in some cases.

The system bus 1813 represents one or more of several possible types of bus structures, including a memory bus or memory controller, a peripheral bus, an accelerated graphics port, or local bus using any of a variety of bus architectures. The system bus 1813, and all buses specified in this description can also be implemented over a wired or wireless network connection and each of the subsystems, including the one or more processors 1803, one or more mass storage devices 1804 (referred to as mass storage 1804), an operating system 1805, software 1806, data 1807, a network adapter 1808, the system memory 1812, an Input/Output Interface 1810, a display adapter 1809, a display device 1811, and a human-machine interface 1802, can be contained within one or more remote computing devices 1814*a,b,c* at physically separate locations, connected through buses of this form, in effect implementing a fully distributed system.

The computing device 1801 typically comprises a variety of computer-readable media. Examples of readable media can be any available media that is accessible by the computing device 1801 and can include, for example, both volatile and non-volatile media, removable and non-removable media. The system memory 1812 comprises computer readable media in the form of volatile memory, such as random access memory (RAM), and/or non-volatile memory, such as read only memory (ROM). The system memory 1812 typically contains data such as the data 1807 and/or program modules such as the operating system 1805 and the software 1806 that are immediately accessible to and/or are presently operated on by the one or more processors 1803.

The computing device 1801 also can comprise other removable/non-removable, volatile/non-volatile computer storage media. As an example, FIG. 18 illustrates the mass storage 1804 which can provide non-volatile storage of computer code, computer readable instructions, data structures, program modules, and other data for the computing device 1801. For example, the mass storage 1804 can be embodied in, or can include, a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage 1804, including by way of example, the operating system 1805 and the software 1806. Each of the operating system 1805 and the software 1806 (or some combination thereof) can comprise elements of the programming and the software 1806. The data 1807 can also be stored on the mass storage 1804. The data 1807 can be stored in any of one or more databases. Examples of such databases comprise, DB2®, Microsoft® Access, Microsoft® SQL Server, Oracle®, mySQL, PostgreSQL, and the like. The databases can be centralized or distributed across multiple systems. In some cases, the computing device 1801 can host one or more of the various subsystems described herein. Execution of the software 1806 by the processor(s) 1803 can cause the computing device 1801 to provide at least some of the functionality described herein in connection with composition and presentation of an interactive electronic document. In example scenarios where the computing device 1801 embodies the computing device 110, the software 1806 can include the application 114 and components therein, such as runtime component 140, coordination component 150, and presentation component 160.

In some configurations, one or more of the subsystems described herein can be hosted in distributed fashion. As such, the software 1806 can be replicated across such computing devices. In other configurations, some components of the software 1806 can be localized in a particular one of the computing devices and other components of the software 1806 can be localized in a second particular one of the computing devices. In such embodiments, execution of the software 1806 by at least one processor present in a combination of the computing device 1801 and the remote computing devices 1814*a,b,c* can cause such a computing system to provide at least some of the functionality described herein in connection with composition and presentation of an interactive electronic document. In some embodiments, at least one of the remote computing devices 1814*a,b,c* can embody, or can host, the package supply subsystem 710 (FIG. 7). Such computing devices also can include software, such as the software 1806, that can embody, or can include, the delivery component 718, the configuration component 714, and the packaging component 716. In addition, or in some embodiments, the computing system 1800 also can embody, or can include, the computing system that permits generating and administering interactive electronic documents in accordance with aspects described herein. To that point, the computing system 1800 can host the computing system 900, including in some cases, the validation subsystem 1210 and components therein (e.g., first component 1250, second component 1260, and third component 1270). In some embodiments, the computing system 1800 can thus include the composition subsystem 910, the device management subsystem 930, the package supply subsystem 710, the device synchronization component(s) 970, the storage subsystems 980, and, in some cases, the validation subsystem 1210, and components therein. In such embodiments, the software 1806 can be replicated across the remote computing devices 1814*a,b,c*, and can embody or can include various components and/or subsystems, such as the composition subsystem 910, the device management subsystem 930, the package supply subsystem 710, the device synchronization component(s) 970, and, in some cases, the validation subsystem 1210 and components therein. Execution of the software 1806 by one or more processors included in the remote computing devices 1814*a,b,c* can provide the functionality described herein in connection with those subsystems and components. Memory devices within the remote computing devices 1814*a,b,c* can embody, or can include, the storage subsystem 980 and data contained therein.

It is noted that the disclosure is not limited to hosting the computing system 900, including in some cases the validation subsystem 1210 and components therein, in a distributed fashion. In some cases, a single computing device, e.g., the computing device 1801 or one of the remote computing devices 1814*a,b,c* can host the computing system 900, including in some cases the validation subsystem 1210 and components therein. That single computing device can include software 1806 can embody or can include various components and/or subsystems, such as the composition subsystem 910, the device management subsystem 930, the package supply subsystem 710, the device synchronization component(s) 970, and, in some cases, the validation subsystem 1210, and components therein. Execution of the software 1806 by one or more processors included in that single computing device can provide the functionality described herein in connection with those subsystems and components. Memory devices within that single computing device can embody, or can include, the storage subsystem 980 and data contained therein.

In another aspect, an end-user can input commands and data into the computing device 1801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1803 via the human-machine interface 1802 that is coupled to the system bus 1813, but can be connected by other interface and bus structures, such as a parallel port, game port, an IEEE 1394 Port (also known as a Firewire port), a serial port, or a universal serial bus (USB).

In yet another aspect, the display device 1811 also can be connected to the system bus 1813 via an interface, such as the display adapter 1809. In some configurations, the computing device 1801 can have more than one display adapter 1809 and the computing device 1801 can have more than one display device 1811. For example, the display device 1811 can be a monitor, an LCD (Liquid Crystal Display), or a projector. In addition to the display device 1811, other output peripheral devices can comprise components such as speakers (not shown) and a printer (not shown) which can be connected to the computing device 1801 via the Input/Output Interface 1810. Any operation and/or result of the methods can be output in any form to an output device. Such output can be any form of visual representation, including, but not limited to, textual, graphical, animation, audio, tactile, and the like. Accordingly, the display device 1811 can present various user interfaces and other information (data, metadata, and/or configuration attributes) pertaining to a tenant-specific service. The display device 1811 and computing device 1801 can be part of one device, or separate devices. The display device 1811 can embody the display device 130 (FIG. 1).

The computing device 1801 can operate in a networked environment using logical connections to one or more remote computing devices 1814a,b,c and/or one or multiple storage server devices 1820. For example, a remote computing device can be a personal computer, portable computer, smartphone, a server, a router, a network computer, a peer device or other common network node, and so on. Logical connections between the computing device 1801 and a remote computing device 1814a,b,c and a server storage device of the server storage device(s) 1820 can be made via a network 1815, such as a local area network (LAN) and/or a general wide area network (WAN). Such network connections can be through the network adapter 1808. The network adapter 1808 can be implemented in both wired and wireless environments.

For purposes of illustration, application programs and other executable program components such as the operating system 1805 are illustrated herein as discrete blocks, although it is recognized that such programs and components reside at various times in different storage components of the computing device 1801, and are executed by the one or more processors 1803 of the computer. An implementation of the software 1806 can be stored on or transmitted across some form of computer-readable media. Any of the disclosed methods can be performed by computer readable instructions embodied on computer-readable media. Computer-readable media can be any available media that can be accessed by a computer. As is described herein, "computer storage media" comprise volatile and non-volatile, removable and non-removable media implemented in any methods or technology for storage of information such as computer-readable instructions, data structures, program modules, or other data.

Numerous other example embodiments emerge from the foregoing detailed description and annexed drawings. Example 1: A computing device, comprising: at least one processor that executes computer-executable components stored in at least one memory device, the computer-executable components comprising, a runtime component configured to apply a navigation logic corresponding to a navigation mode for a series of views, each view in the series of views comprising a respective prompt; and a coordination component configured to cause presentation of at least one view of the series of views in response to the runtime component applying the navigation logic.

Example 2: The computing device of Example 1, wherein the computer-executable components further comprise a presentation component configured to draw respective user interfaces corresponding to the at least one view.

Example 3: The computing device of Example claim 1, wherein the runtime component comprises a runtime interface that functionally couples the runtime component to the coordination component.

Example 4: The computing device of Example 1, wherein the series of views represents an interactive, and wherein the navigation mode defines a manner of traversal of the interactive electronic document.

Example 5: The computing device of Example 4, wherein the navigation mode corresponds to a linear mode, a hub-and-spoke mode, or a computer adaptive test (CAT) mode.

Example 6: The computing device of Example 4, wherein the interactive electronic document comprises a questionnaire corresponding to one of a clinical outcome assessment, a triage assessment, neuropsychological assessment, a scholastic aptitude assessment, a vocational assessment, a professional certification assessment, a survey, or an independent-task guide.

Example 7: The computing device of Example 1, wherein the series of views represents a consent document, a privacy practice document, or a liability waiver document.

Example 8: The computing device of Example 1, wherein causing presentation of the at least one view of the series of views further comprises implementing layout logic in response to the runtime component applying the navigation rule, the layout logic corresponding to a particular combination of two or more of a specific computing device, a natural language, or a user interface (UI) toolkit.

Example 9: The computing device of claim 8, further comprising a library of user interface (UI) elements including at least one presentation element and at least one control element, wherein the implementing the layout logic comprises, obtaining, via a first interface, a UI element from the library of UI elements; and supplying one or more UI elements for inclusion in a defined layout of areas within a first user interface corresponding to a view of the at least one view.

Example 10: The computing device of Example 1, wherein the runtime component is further configured to apply at least one of branching logic or validation logic based on input data responsive to a first prompt in a first view of the at least one view.

Example 11: The computing device of Example 1, wherein the coordination component is further configured to implement translation logic for a first view of the at least one view.

Example 12: The computing device of Example 10, wherein implementing the translation logic comprises, determining that a translation rule is satisfied for a particular view of the at least one view; and translating a first natural language statement presented in a first natural language within the particular view to a second natural language statement in a second natural language.

Example 13: A computer-implemented method, comprising: presenting, during execution of an application to traverse a series of views of an interactive electronic document, based on current state data, a user interface (UI) corresponding to a view of the series of views, wherein the UI includes a presentation element representing a prompt and at least one navigation control element; receiving, by a coordination component of the application, from a presentation component of the application, prompt response data responsive to the prompt; sending, by the coordination component, the prompt response data to a runtime component of the application; applying, by the runtime component, at least one of branching logic or validation logic to the prompt response data and the current state data, resulting in next state data; applying, by the runtime component, navigation logic to the current state data; and presenting, in response to the applying the navigation logic, based on the next state data, a second UI corresponding to a second view of the series of views, wherein the second UI includes a second prompt and at least one second navigation control element.

Example 14: The computer-implemented method of Example 13, further comprising, receiving, by the coordination component, from the presentation component, navigation response data corresponding to selection of a particular navigation control of the at least one second navigation control; sending, by the coordination component, the navigation response data to the runtime component; applying, by the runtime component, navigation logic to the next state data; and presenting, in response to the applying the navigation logic, based on the next state data, a third UI corresponding to a third view of the series of views.

Example 15: The computer-implemented method of Example 13, wherein the presenting the UI comprises, obtaining, by the coordination component, from the runtime component, data defining the prompt; directing, by the coordination component, the presentation component to draw the UI; and drawing, by the presentation component, the UI at a display device.

Example 16: The computer-implemented method of Example 13, further comprising obtaining, by the runtime component, the navigation logic by receiving a group of rules corresponding to a navigation mode that defines a manner of traversal of the series of views, the group of rules being received in a native format for a rule library included in the runtime component.

Example 17: The computer-implemented method of Example 13, wherein the obtaining, by the runtime component, the navigation logic further comprises retaining the group of rules at the rule library.

Example 18: The computer-implemented method of Example 13, further comprising obtaining, by the runtime component, the branching logic and the validation logic.

Example 19: The computer-implemented method of Example 18, wherein obtaining, by the runtime component, the branching logic and the validation logic comprises, receiving first human-readable content defining the branching logic and second human-readable content defining the validation logic, the first human-readable content and the second human-readable content being formatted according to a core definition language; and transforming the branching logic and the validation logic into a second group of rules formatted according to the native format.

Example 20: The computer-implemented method of Example 15, wherein the runtime component comprises a rules component, and wherein the applying, by the runtime component, the navigation logic, the branching logic, or the validation logic comprises applying, by the rules component, one or more of a particular rule of the group of rules or a particular rule of the second group of rules.

Example 21: The computer-implemented method of Example 13, further comprising obtaining, by the runtime component, the navigation logic by selecting a navigation mode component defining a navigation mode corresponding to a navigation mode that defines a manner of traversal of the series of views.

Example 22: The computer-implemented method of Example 21, further comprising obtaining, by the runtime component, the branching logic and the validation logic.

Example 23: The computer-implemented method of Example 22, wherein obtaining, by the runtime component, the branching logic and the validation logic comprises receiving first human-readable content defining branching logic and second human-readable content defining the validation logic, wherein the first human-readable content and the second human-readable content are formatted according to a core definition language.

Example 24: The computer-implemented method of Example 21, wherein the runtime component comprises an interpreter component, and wherein the applying, by the runtime component, the navigation logic comprises executing, by the interpreter component, the navigation mode component.

Example 25: The computer-implemented method of Example 23, wherein the runtime component comprises an interpreter component, and wherein the applying the branching logic or the validation logic comprises applying, by the interpreter component, the branching logic or the validation logic directly in the core definition language.

Example 26: The computer-implemented method of Example 13, wherein the prompt response data is formatted according to JavaScript object notation (JSON).

Example 27: The computer-implemented method of Example 14, wherein the navigation response data is formatted according to JavaScript object notation (JSON).

Example 28: The computer-implemented method of Example 14, further comprising receiving data defining layout logic configured for a combination of the interactive electronic document, a particular natural language, and particular visualization resources, the data being formatted according to a code definition language.

Example 29: The computer-implemented method of Example 21, further comprising a library of user interface (UI) elements including at least one presentation element and at least one control element, wherein the directing the presentation component to draw the UI comprises passing the data defining the layout logic to the presentation component for interpretation by the library of UI elements.

Example 30: The computer-implemented method of Example 29, wherein the drawing, by the presentation component, the UI at the display device comprises: obtaining, at runtime, a UI element from the library of UI elements; and supplying one or more UI elements for inclusion in a defined layout of areas within the UI.

Example 31: The computer-implemented method of Example 30, wherein the UI element is configured according to one or more visualization resources of the display device, the one or more visualization resources being defined by the layout logic and comprising a graphics resolution and size of visualization area.

Example 32: The computer-implemented method of claim 14, further comprising: receiving data defining translation logic; and applying the translation logic to the data defining the prompt.

Example 33: At least one non-transitory computer-readable storage medium having processor-executable instructions encoded thereon that, in response to execution, cause a computing device to: present, during execution of an application to traverse a series of views of an interactive electronic document, based on current state data, a user interface (UI) corresponding to a view of the series of views, wherein the UI includes a presentation element representing a prompt and at least one navigation control element; receive, by a coordination component of the application, from a presentation component of the application, prompt response data responsive to the prompt; send, by the coordination component, the prompt response data to a runtime component of the application; apply, by the runtime component, at least one of branching logic or validation logic to the prompt response data and the current state data, resulting in next state data; apply, by the runtime component, navigation logic to the current state data; and present, in response to the applying the navigation logic, based on the next state data, a second UI corresponding to a second view of the series of views, wherein the second UI includes a second prompt and at least one second navigation control element.

Example 34: The at least one non-transitory computer-readable storage medium of Example 33, wherein the processor-executable instructions, in response to further execution, further cause the computing device to: receive, by the coordination component, from the presentation component, navigation response data corresponding to selection of a particular navigation control of the at least one second navigation control; send, by the coordination component, the navigation response data to the runtime component; apply, by the runtime component, navigation logic to the next state data; and present, in response to the applying the navigation logic, based on the next state data, a third UI corresponding to a third view of the series of views.

Example 35: The at least one non-transitory computer-readable storage medium of Example 33, wherein presenting the UI comprises: obtaining, by the coordination component, from the runtime component, data defining the prompt; directing, by the coordination component, the presentation component to draw the UI; and drawing, by the presentation component, the UI at a display device.

Example 36: The at least one non-transitory computer-readable storage medium of Example 33, wherein the processor-executable instructions, in response to further execution, further cause the computing device to obtain, by the runtime component, the navigation logic by receiving a group of rules corresponding to a navigation mode that defines a manner of traversal of the series of views, the group of rules being received in a native format for a rule library included in the runtime component.

Example 37: The at least one non-transitory computer-readable storage medium of Example 33, wherein obtaining, by the runtime component, the navigation logic further comprises retaining the group of rules at the rule library.

Example 38: The at least one non-transitory computer-readable storage medium of Example 33, further comprising obtaining, by the runtime component, the branching logic and the validation logic.

Example 39: The at least one non-transitory computer-readable storage medium of Example 38, wherein obtaining, by the runtime component, the branching logic and the validation logic comprises: receiving first human-readable content defining the branching logic and second human-readable content defining the validation logic, the first human-readable content and the second human-readable content being formatted according to a core definition language; and transforming the branching logic and the validation logic into a second group of rules formatted according to the native format.

Example 40: The at least one non-transitory computer-readable storage medium of Example 35, wherein the runtime component comprises a rules component, and wherein applying, by the runtime component, the navigation logic, the branching logic, or the validation logic comprises applying, by the rules component, one or more of a particular rule of the group of rules or a particular rule of the second group of rules.

Example 41: The at least one non-transitory computer-readable storage medium of claim 33, wherein the processor-executable instructions, in response to further execution, further cause the computing device to obtain, by the runtime component, the navigation logic by selecting a navigation mode component defining a navigation mode corresponding to a navigation mode that defines a manner of traversal of the series of views.

Examples 42: The at least one non-transitory computer-readable storage medium of Example 41, wherein the processor-executable instructions, in response to further execution, further cause the computing device to obtain, by the runtime component, the branching logic and the validation logic.

Example 43: The at least one non-transitory computer-readable storage medium of Example 42, wherein obtaining, by the runtime component, the branching logic and the validation logic comprises receiving first human-readable content defining branching logic and second human-readable content defining the validation logic, wherein the first human-readable content and the second human-readable content are formatted according to a core definition language.

Example 44: The at least one non-transitory computer-readable storage medium of Example 41, wherein the runtime component comprises an interpreter component, and wherein applying, by the runtime component, the navigation logic comprises executing, by the interpreter component, the navigation mode component.

Example 45: The at least one non-transitory computer-readable storage medium of Example 43, wherein the runtime component comprises an interpreter component, and wherein applying the branching logic or the validation logic comprises applying, by the interpreter component, the branching logic or the validation logic directly in the core definition language.

Example 46: The at least one non-transitory computer-readable storage medium of Example 33, wherein the prompt response data is formatted according to JavaScript object notation (JSON).

Example 47: The at least one non-transitory computer-readable storage medium of claim 44, wherein the navigation response data is formatted according to JavaScript object notation (JSON).

Example 48: The at least one non-transitory computer-readable storage medium of claim 44, wherein the processor-executable instructions, in response to further execution, further cause the computing device to receive data defining layout logic configured for a combination of the interactive electronic document, a particular natural language, and particular visualization resources, the data being formatted according to a code definition language.

Example 49: The at least one non-transitory computer-readable storage medium of claim 41, wherein the computing device comprises a library of user interface (UI) elements including at least one presentation element and at least one control element, wherein the directing the presentation component to draw the UI comprises passing the data defining the layout logic to the presentation component for interpretation by the library of UI elements.

Example 50: The at least one non-transitory computer-readable storage medium of Example 49, wherein drawing, by the presentation component, the UI at the display device comprises: obtaining, at runtime, a UI element from the library of UI elements; and supplying one or more UI elements for inclusion in a defined layout of areas within the UI.

Example 51: A computing device comprising: one or more processors; and one or more memory devices storing processor-executable instructions that, in response to execution by the one or more processors, cause the computing device to: present, during execution of an application to traverse a series of views of an interactive electronic document, based on current state data, a user interface (UI) corresponding to a view of the series of views, wherein the UI includes a presentation element representing a prompt and at least one navigation control element; receive, by a coordination component of the application, from a presentation component of the application, prompt response data responsive to the prompt; send, by the coordination component, the prompt response data to a runtime component of the application; apply, by the runtime component, at least one of branching logic or validation logic to the prompt response data and the current state data, resulting in next state data; apply, by the runtime component, navigation logic to the current state data; and present, in response to the applying the navigation logic, based on the next state data, a second UI corresponding to a second view of the series of views, wherein the second UI includes a second prompt and at least one second navigation control element.

Example 52: The computing device of Example 51, wherein the processor-executable instructions, in response to further execution, further cause the computing device to: receive, by the coordination component, from the presentation component, navigation response data corresponding to selection of a particular navigation control of the at least one second navigation control; send, by the coordination component, the navigation response data to the runtime component; apply, by the runtime component, navigation logic to the next state data; and present, in response to the applying the navigation logic, based on the next state data, a third UI corresponding to a third view of the series of views.

Example 53: The computing device of Example 51, wherein presenting the UI comprises: obtaining, by the coordination component, from the runtime component, data defining the prompt; directing, by the coordination component, the presentation component to draw the UI; and drawing, by the presentation component, the UI at a display device.

Example 54: The computing device of Example 51, wherein the processor-executable instructions, in response to further execution, further cause the computing device to obtain, by the runtime component, the navigation logic by receiving a group of rules corresponding to a navigation mode that defines a manner of traversal of the series of views, the group of rules being received in a native format for a rule library included in the runtime component.

Example 55: The computing device of Example 51, wherein obtaining, by the runtime component, the navigation logic further comprises retaining the group of rules at the rule library.

Example 56: The computing device of Example 51, wherein the processor-executable instructions, in response to further execution, further cause the computing device to obtain, by the runtime component, the branching logic and the validation logic.

Example 57: The computing device of Example 56, wherein obtaining, by the runtime component, the branching logic and the validation logic comprises: receiving first human-readable content defining the branching logic and second human-readable content defining the validation logic, the first human-readable content and the second human-readable content being formatted according to a core definition language; and transforming the branching logic and the validation logic into a second group of rules formatted according to the native format.

Example 58: The computing device of Example 53, wherein the runtime component comprises a rules component, and wherein applying, by the runtime component, the navigation logic, the branching logic, or the validation logic comprises applying, by the rules component, one or more of a particular rule of the group of rules or a particular rule of the second group of rules.

Example 59: The computing device of Example 51, wherein the processor-executable instructions, in response to further execution, further cause the computing device to obtain, by the runtime component, the navigation logic by selecting a navigation mode component defining a navigation mode corresponding to a navigation mode that defines a manner of traversal of the series of views.

Example 60: The computing device of Example 59, wherein the processor-executable instructions, in response to further execution, further cause the computing device to obtain, by the runtime component, the branching logic and the validation logic.

Example 61: The computing device of Example 60, wherein obtaining, by the runtime component, the branching logic and the validation logic comprises receiving first human-readable content defining branching logic and second human-readable content defining the validation logic, wherein the first human-readable content and the second human-readable content are formatted according to a core definition language.

Example 62: The computing device of Example 59, wherein the runtime component comprises an interpreter component, and wherein applying, by the runtime component, the navigation logic comprises executing, by the interpreter component, the navigation mode component.

Example 63: The computing device of Example 61, wherein the runtime component comprises an interpreter component, and wherein applying the branching logic or the validation logic comprises applying, by the interpreter component, the branching logic or the validation logic directly in the core definition language.

Example 64: The computing device of Example 51, wherein the prompt response data is formatted according to JavaScript object notation (JSON).

Example 65: The computing device of Example 62, wherein the navigation response data is formatted according to JavaScript object notation (JSON).

Example 66: The computing device of Example 62, wherein the processor-executable instructions, in response to further execution, further cause the computing device to receive data defining layout logic configured for a combination of the interactive electronic document, a particular natural language, and particular visualization resources, the data being formatted according to a code definition language.

Example 67: The computing device of Example 59, wherein the computing device comprises a library of user interface (UI) elements including at least one presentation element and at least one control element, wherein the directing the presentation component to draw the UI comprises passing the data defining the layout logic to the presentation component for interpretation by the library of UI elements.

Example 68: The computing device of Example 67, wherein drawing, by the presentation component, the UI at the display device comprises: obtaining, at runtime, a UI element from the library of UI elements; and supplying one or more UI elements for inclusion in a defined layout of areas within the UI.

It is to be understood that the methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

As is used in this specification and annexed drawings, the terms "module," "component," "system," "platform," and the like, can refer to and/or can include a computer-related entity or an entity related to an operational machine with one or more specific functionalities. Such entities can be either hardware, a combination of hardware and software, software (program code or executable program code, for example), or software in execution. In one example, a component can be a process running on a processor, a processor, an object, an executable (e.g., binary software), a thread of execution, a computer program, and/or a computing device. Simply as an illustration, a software application running on a server device can be a component and the server device also can be a component. One or more modules can reside within a process and/or thread of execution. One or more components also can reside within a process and/or thread of execution. Each one of a module and a component can be localized on one computing device and/or distributed between two or more computing devices. In another example, respective components (or modules) can execute from various computer-readable storage media having various data structures stored thereon. The components (or modules) can communicate via local and/or remote processes such as in accordance with a signal having one or more data packets (e.g., data from one component interacting with another component in a local system, distributed system, and/or across a network such as the Internet with other systems via the signal). As another illustrations, in some cases, a component can emulate an electronic component via a virtual machine, e.g., within a cloud computing system. The terms "module" and "component" (and their plural versions) may be used interchangeably where clear from context, in some cases.

As is used in this specification and annexed drawings, the term "processor" can refer to substantially any computing processing unit or computing device, including single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to electronic circuitry designed in assembled to execute code instructions and/or operate on data and signaling. Such electronic circuitry can be assembled in a chipset, for example. Accordingly, in some cases, a processor can be embodied, or can include, an application specific integrated circuit (ASIC), a digital signal processor (DSP), a field programmable gate array (FPGA), a complex programmable logic device (CPLD), a discrete gate or transistor logic, discrete hardware components, or any combination thereof designed and assembled to perform the functionality described herein. Further, in some cases, processors can exploit nano-scale architectures, such as molecular and quantum-dot based transistors, switches and gates, in order to optimize space usage or enhance performance of computing devices. A processor can also be implemented as a combination of computing processing units.

Further, in this specification and annexed drawings, terms such as "storage," "data storage," "repository," and substantially any other information storage component relevant to operation and functionality of a system, subsystem, module, and component are utilized to refer to "memory components," entities embodied in a "memory," or components including a memory. As is described herein, memory and/or memory components of this disclosure can be either volatile memory or nonvolatile memory, or can include both volatile and nonvolatile memory. Simply as an illustration, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Embodiments of this disclosure are not limited to these types of memory, and other types of memory devices can be contemplated.

The methods, apparatuses, devices, and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method, comprising:
   receiving first input data defining a definition configuration file corresponding to an interactive electronic document;
   generating, using the first input data, the definition configuration file within a data repository;
   receiving second input data defining one or more natural language translation configuration files corresponding to the interactive electronic document;
   generating, using the second input data, the one or more natural language translation configuration files within the data repository;
   receiving third input data defining one or more layout configuration files corresponding to the interactive electronic document;
   generating, using the third input data, the one or more layout configuration files within the data repository; and
   generating, within the data repository, a configuration package comprising the definition configuration file, a particular natural language translation configuration file of the one or more natural language translation configuration files, and a particular layout configuration file of the one or more layout configuration files.

2. The computer-implemented method of claim 1, further comprising,
   receiving, from a computing device, a request for a particular combination of the interactive electronic document, natural language, and type of device and display resolution; and
   determining that a second configuration package within the data repository satisfies the request, the second configuration package including a particular definition configuration file corresponding to the interactive electronic document, one or more second natural language translation configuration files, and one or more second layout configuration files.

3. The computer-implemented method of claim 2, further comprising generating, based on the request, a deliverable configuration package by extracting, from the second configuration package, the particular definition configuration file, a particular natural language translation configuration file of the one or more second natural language translation configuration files, and a particular layout configuration file of the one or more second layout configuration files,
   wherein the particular natural language translation configuration file corresponds to the natural language, and
   wherein the particular layout configuration file corresponds to the type of device and the display resolution.

4. The computer-implemented method of claim 3, further comprising sending the deliverable configuration package to the computing device.

5. The computer-implemented method of claim 3, wherein the extracting comprises:
   identifying the particular layout configuration file by analyzing language indicative of the type of device and the display resolution within each one of the one or more second layout configuration files;
   determining, within the particular layout configuration file, a reference to the particular natural language translation configuration file; and
   determining, within the particular natural language translation configuration file, a reference to the particular definition configuration file.

6. The computer-implemented method of claim 1, wherein the generating the definition configuration file comprises:
   generating a unique identifier; and
   incorporating the unique identifier into the definition configuration file.

7. The computer-implemented method of claim 1, wherein the generating the one or more natural language translation configuration files comprises:
   generating a unique identifier; and
   incorporating the unique identifier into the one or more natural language translation configuration files.

8. The computer-implemented method of claim 1, wherein the generating the one or more layout configuration files comprises:
   generating a unique identifier; and
   incorporating the unique identifier into the one or more layout configuration files.

9. The computer-implemented method of claim 1, wherein the third input data further defines a version of a runtime bundle for use with a configuration package that includes the one or more layout configuration files.

10. The computer-implemented method of claim 9, further comprising applying one or more integrity tests to the one or more layout configuration files against one or more versions of a user-interface library corresponding to the version of the runtime bundle.

11. The computer-implemented method of claim 9, further comprising applying one or more integrity tests to the one or more layout configuration files against one or more versions of a user-interface library corresponding to the version of the runtime bundle.

12. A computing device, comprising:
    one or more processors; and
    one or more memory devices storing computer-executable instructions that, in response to execution by the one or more processors, cause the computing device to,
      receive first input data defining a definition configuration file corresponding to an interactive electronic document;
      generate, using the first input data, the definition configuration file within a data repository;
      receive second input data defining one or more natural language translation configuration files corresponding to the interactive electronic document;
      generate, using the second input data, the one or more natural language translation configuration files within the data repository;
      receive third input data defining one or more layout configuration files corresponding to the interactive electronic document;
      generate, using the third input data, the one or more layout configuration files within the data repository; and
      generate, within the data repository, a configuration package comprising the definition configuration file, a particular natural language translation configuration file of the one or more natural language translation configuration files, and a particular layout configuration file of the one or more layout configuration files.

13. The computing device of claim 12, the one or more memory devices storing further computer-executable instructions that, in response to further execution by the one or more processors, further cause the computing device to,
   receive, from a second computing device, a request for a particular combination of the interactive electronic document, natural language, and type of device and display resolution; and
   determine that a second configuration package within the data repository satisfies the request, the second configuration package including a particular definition configuration file corresponding to the interactive electronic document, one or more second natural language translation configuration files, and one or more second layout configuration files.

14. The computing device of claim 13, the one or more memory devices storing further computer-executable instructions that, in response to further execution by the one or more processors, further cause the computing device to generate, based on the request, a deliverable configuration package by extracting, from the second configuration package, the particular definition configuration file, a particular natural language translation configuration file of the one or more second natural language translation configuration files, and a particular layout configuration file of the one or more second layout configuration files,
   wherein the particular natural language translation configuration file corresponds to the natural language, and
   wherein the particular layout configuration file corresponds to the type of device and the display resolution.

15. The computing device of claim 14, the one or more memory devices storing further computer-executable instructions that, in response to further execution by the one or more processors, further cause the computing device to send the deliverable configuration package to the second computing device.

16. The computing device of claim 14, wherein the extracting comprises:
   identifying the particular layout configuration file by analyzing language indicative of the type of device and the display resolution within each one of the one or more second layout configuration files;
   determining, within the particular layout configuration file, a reference to the particular natural language translation configuration file; and
   determining, within the particular natural language translation configuration file, a reference to the particular definition configuration file.

17. The computing device of claim 12, wherein generating, using the first input data, the definition configuration file comprises:
   generating a unique identifier; and
   incorporating the unique identifier into the definition configuration file.

18. The computing device of claim 12, wherein the generating, using the second input data, the one or more natural language translation configuration files comprises:
   generating a unique identifier; and
   incorporating the unique identifier into the one or more natural language translation configuration files.

19. The computing device of claim 12, wherein generating, using the third input data, the one or more layout configuration files comprises:
   generating a unique identifier; and
   incorporating the unique identifier into the one or more layout configuration files.

20. The computing device of claim 12, wherein the third input data further defines a version of a runtime bundle for use with a configuration package that includes the one or more layout configuration files.

21. At least one non-transitory computer-readable storage medium having processor-executable instructions encoded thereon that, in response to execution, cause a computing device to:
   receive first input data defining a definition configuration file corresponding to an interactive electronic document;
   generate, using the first input data, the definition configuration file within a data repository;
   receive second input data defining one or more natural language translation configuration files corresponding to the interactive electronic document;
   generate, using the second input data, the one or more natural language translation configuration files within the data repository;
   receive third input data defining one or more layout configuration files corresponding to the interactive electronic document;
   generate, using the third input data, the one or more layout configuration files within the data repository; and
   generate, within the data repository, a configuration package comprising the definition configuration file, a particular natural language translation configuration file of the one or more natural language translation configuration files, and a particular layout configuration file of the one or more layout configuration files.

22. The at least one non-transitory computer-readable storage medium of claim 21, wherein the processor-executable instructions, in further response to execution, further cause the computing device to:
   receive, from a second computing device, a request for a particular combination of the interactive electronic document, natural language, and type of device and display resolution; and
   determine that a second configuration package within the data repository satisfies the request, the second configuration package including a particular definition configuration file corresponding to the interactive electronic document, one or more second natural language translation configuration files, and one or more second layout configuration files.

23. The at least one non-transitory computer-readable storage medium claim 22, wherein the processor-executable instructions, in further response to execution, further cause the computing device to generate, based on the request, a deliverable configuration package by extracting, from the second configuration package, the particular definition configuration file, a particular natural language translation configuration file of the one or more second natural language translation configuration files, and a particular layout configuration file of the one or more second layout configuration files,
   wherein the particular natural language translation configuration file corresponds to the natural language, and
   wherein the particular layout configuration file corresponds to the type of device and the display resolution.

24. The at least one non-transitory computer-readable storage medium of claim 23, wherein the processor-executable instructions, in further response to execution, further cause the computing device to send the deliverable configuration package to the second computing device.

25. The at least one non-transitory computer-readable storage medium of claim 23, wherein the extracting comprises:
- identifying the particular layout configuration file by analyzing language indicative of the type of device and the display resolution within each one of the one or more second layout configuration files;
- determining, within the particular layout configuration file, a reference to the particular natural language translation configuration file; and
- determining, within the particular natural language translation configuration file, a reference to the particular definition configuration file.

* * * * *